US008602580B2

(12) United States Patent
Ikuta

(10) Patent No.: US 8,602,580 B2
(45) Date of Patent: Dec. 10, 2013

(54) LIGHTING DEVICE, DISPLAY DEVICE AND TELEVISION RECEIVER

(75) Inventor: Kaori Ikuta, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/505,750

(22) PCT Filed: Oct. 22, 2010

(86) PCT No.: PCT/JP2010/068699
§ 371 (c)(1),
(2), (4) Date: May 3, 2012

(87) PCT Pub. No.: WO2011/067995
PCT Pub. Date: Jun. 9, 2011

(65) Prior Publication Data
US 2013/0188100 A1     Jul. 25, 2013

(30) Foreign Application Priority Data

Dec. 2, 2009  (JP) .................................. 2009-274542

(51) Int. Cl.
*G09F 13/04* (2006.01)
*F21S 6/00* (2006.01)

(52) U.S. Cl.
USPC ........ 362/97.1; 362/97.2; 362/97.3; 362/257; 362/296.01; 362/308

(58) Field of Classification Search
None
See application file for complete search history.

(56) References Cited

U.S. PATENT DOCUMENTS

| 7,510,314 B2 * | 3/2009 | Arai et al. .................... 362/609 |
| 7,901,102 B2 * | 3/2011 | Jung et al. ................... 362/97.3 |
| 2005/0265020 A1 | 12/2005 | Kim |
| 2006/0087827 A1 | 4/2006 | Jung et al. |
| 2007/0121320 A1 | 5/2007 | Arai et al. |

FOREIGN PATENT DOCUMENTS

| EP | 2 434 196 A1 | 3/2012 |
| EP | 2 515 028 A1 | 10/2012 |
| JP | 03-43208 U | 4/1991 |
| JP | 2001-135122 A | 5/2001 |
| JP | 2006-059606 A | 3/2006 |
| JP | 2006-120644 A | 5/2006 |
| JP | 2007-012569 A | 1/2007 |
| JP | 2009-212056 A | 9/2009 |

OTHER PUBLICATIONS

Official Communication issued in International Patent Application No. PCT/JP2010/068699, mailed on Nov. 16, 2010.

* cited by examiner

*Primary Examiner* — Natalie Walford
(74) *Attorney, Agent, or Firm* — Keating & Bennett, LLP

(57) ABSTRACT

An object of the present invention is to realize the suppression of uneven brightness at low cost in a lighting device. A backlight unit 12 according to the present invention includes: LEDs 17 as a light source; a chassis 14 including a bottom plate 14a disposed on a side opposite to a light output side with respect to the LEDs 17 and housing the LEDs 17; and a first reflection sheet 22 reflecting light including a square-shaped bottom portion 24 disposed along the bottom plate 14a, and at least two rising portions 25 and 26 rising from at least two adjacent sides of the bottom portion 24 toward the light output side such that a seam J is formed between adjacent side edges 25a and 26a. An overhang portion 28 is formed on the side edge 25a of the first rising portion 25 of the at least two rising portions 25 and 26. The overhang portion 28 overhangs beyond the seam J in a direction from the bottom portion 24 to the second rising portion 26.

24 Claims, 34 Drawing Sheets

FIG.1
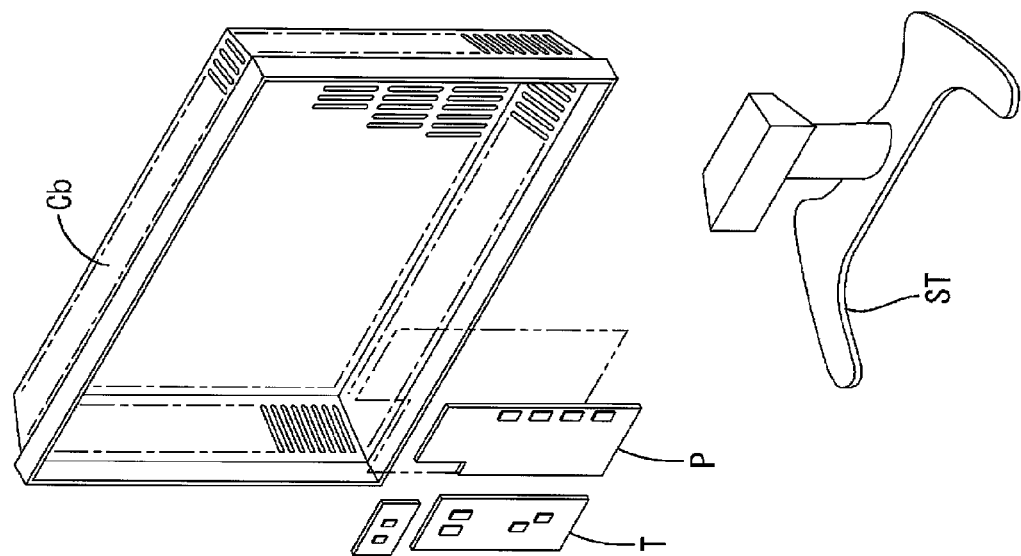
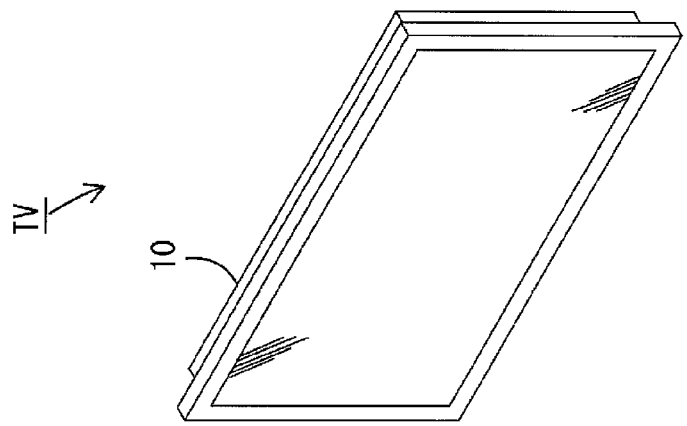
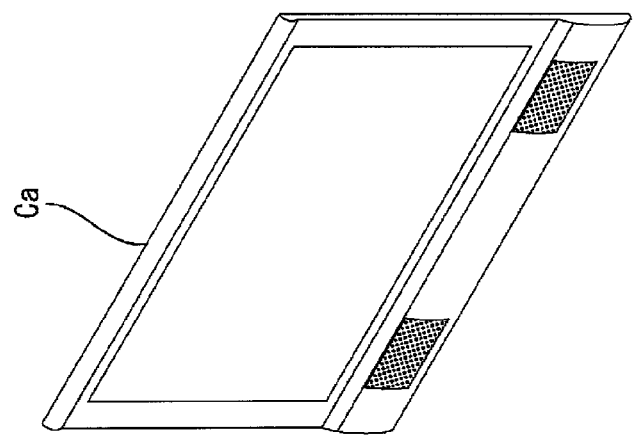

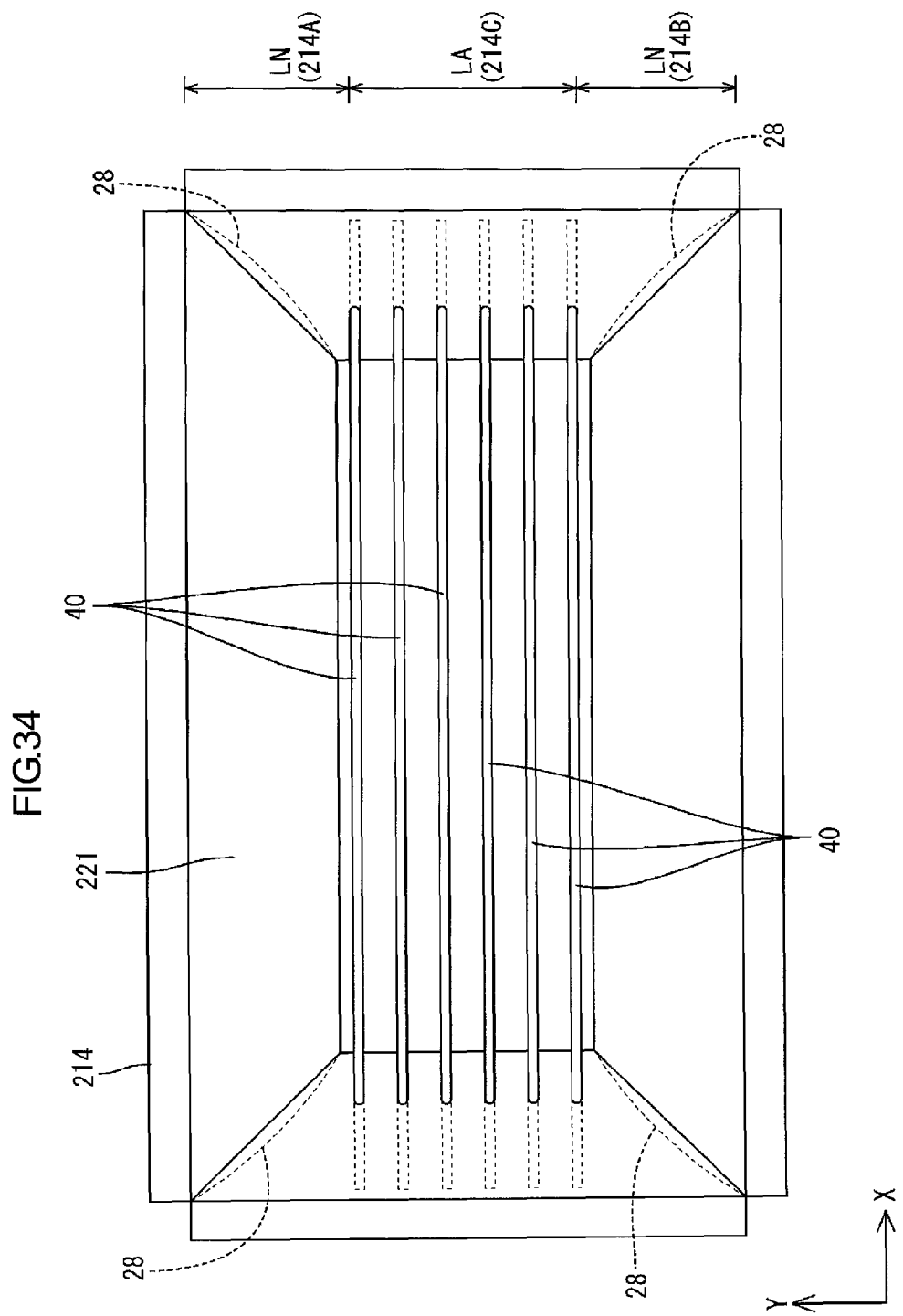

LIGHTING DEVICE, DISPLAY DEVICE AND TELEVISION RECEIVER

TECHNICAL FIELD

The present invention relates to a lighting device, a display device, and a television receiver.

BACKGROUND ART

A liquid crystal panel used in a liquid crystal display device, such as a liquid crystal television set, does not emit light by itself. Thus, the liquid crystal panel uses a backlight unit as a separate lighting device. This backlight unit is installed on a back side (on a side opposite to the display surface) of the liquid crystal panel and includes: a chassis having an opening on the liquid crystal panel side; a light source housed in the chassis; a reflection sheet disposed along an inner surface of the chassis and reflecting light toward the opening side of the chassis; and an optical member (such as a diffuser sheet) disposed at the opening of the chassis for causing the light emitted from the light source to be efficiently output toward the liquid crystal panel side.

In the backlight unit of the above configuration, LEDs may be used as the light source for saving power consumption. For example, a number of LEDs are disposed two-dimensionally on a bottom plate of the chassis. However, there has been the problem that, when the output light from the backlight unit is observed from a front side, dark areas are generated at the four corner portions of the screen due to insufficient light amount. In order to solve this problem, a technology is proposed in Patent Document 1 described below.

Patent Document 1: Japanese Unexamined Patent Publication No. 2006-120644

Problem to be Solved by the Invention

Patent Document 1 discloses that, in the configuration where LEDs are disposed two-dimensionally on the bottom plate of the chassis, the number of LEDs to be installed in the vicinity of the corner portions is increased compared to the number of LEDs to be installed at a central portion. In this way, the insufficient light amount at the corner portions can be compensated by the light emitted from the increased number of LEDs in the vicinity of the corner portions.

However, when the technology according to Patent Document 1 is adopted, the total number of LEDs to be installed in the backlight unit is increased, resulting in an increase in manufacturing cost due to the increase in the number of the LEDs. In addition, in order to vary the numbers of the LEDs to be installed depending on the positions in the chassis, the LEDs need to be disposed on the LED board unevenly, which requires the manufacture of a special LED board. Thus, a general-purpose LED board with LEDs disposed at regular intervals cannot be used, thereby resulting in a further increase in manufacturing cost.

DISCLOSURE OF THE PRESENT INVENTION

The present invention has been made in view of the foregoing circumstances, and an object of the present invention is to suppress uneven brightness at low cost.

Means for Solving the Problem

According to the present invention, a lighting device includes: a light source; a chassis including a bottom plate disposed on a side opposite to a light output side with respect to the light source and housing the light source; and a reflection member configured to reflect light and including a square-shaped bottom portion disposed along the bottom plate, and at least two rising portions rising from at least two adjacent sides of the bottom portion toward the light output side, with a seam formed between adjacent side edges of the at least two rising portions. An overhang portion is formed on the side edge of one of the at least two rising portions. The overhang portion overhangs beyond the seam in a direction from the bottom portion to the other rising portion.

In this way, light from the light source is reflected by the reflection member having the bottom portion and the rising portions. Thus, the light can be efficiently output. The seam is formed between the adjacent side edges of the at least two rising portions rising from the at least two adjacent sides of the square-shaped bottom portion of the reflection member toward the light output side. If a gap is formed in the seam due to warping deformation of the rising portions, light may leak through the gap and thereby local dark areas may be generated. Such a problem may be overcome by, for example, disposing more light sources near the seam. However, in this case, the number of the light sources to be installed increases, resulting in an increase in cost.

According to the present invention, the overhang portion is formed on the side edge of one of the at least two rising portions. The overhang portion overhangs in a direction from the bottom portion to the other rising portion beyond the seam formed between the side edges of the one and the other rising portions. The other rising portion, when subjected to warping deformation, is displaced in a direction from the bottom portion to the other rising portion in a manner of being pulled; namely, the side edge of the other rising portion is displaced away from the side edge of the one rising portion. However, because the overhang portion formed on the side edge of the one rising portion overhangs beyond the seam in the direction of displacement of the other rising portion, the development of a gap between the side edges of the one and the other rising portions can be prevented. Thus, the leakage of light through the seam can be prevented without increasing the number of the light sources to be installed, thus making it possible to suppress uneven brightness at low cost.

Preferred embodiments of the present invention may include the following.

(1) The bottom portion may have an elongated square shape, the other rising portion may rise from a short side of the bottom portion, and the one rising portion having the overhang portion may rise from a long side of the bottom portion. When thermal expansion is caused in the elongated square-shaped bottom portion due to a change in thermal environment, the amount of thermal expansion in the short side direction tends to be larger than the amount of thermal expansion in the long side direction. Thus, a rising proximal position of the other rising portion rising from the short side tends to be displaced due to thermal expansion of the bottom portion in the long side direction, resulting in warping deformation of the other rising portion. In this respect, according to the present invention, since the overhang portion is formed on the one rising portion rising from the long side, even when warping deformation is caused in the other rising portion on the short side and the side edge of the other rising portion is displaced away from the side edge of the one rising portion on the long side, the leakage of light can be effectively prevented by the overhang portion.

(2) Each of the other rising portion may rise from a pair of short sides of the bottom portion, and each of the one rising portion may rise from a pair of long sides of the bottom portion. The overhang portion may be formed on both of the side edges of the pair of one rising portions. In this way, even when the other rising portions rising from the pair of short sides are subjected to warping deformation due to thermal expansion of the bottom portion, the development of a gap in the seam formed at any of the four locations between the side edges of the pair of the other rising portions and the pair of the one rising portions that are adjacent to each other can be prevented because of the overhang portions formed on both of the side edges of the one rising portions rising from the long sides adjacent to the respective short sides. Thus, uneven brightness can be effectively suppressed.

(3) The overhanging dimension of the overhang portion from the side edge of the one rising portion may be larger in a central portion between a rising proximal side portion and a rising distal side portion than in the rising proximal side portion and the rising distal side portion. At the time of warping deformation, the other rising portion is displaced more in the central portion than in the rising distal side portion and the rising proximal side portion. However, because the overhang portion is configured to have the overhanging dimension from the side edge of the one rising portion, and to have a shape similar to the shape of the other rising portion at the time of warping deformation, the development of a gap in the seam between the side edges of the one and the other rising portions can be appropriately prevented. Thus, uneven brightness can be more reliably suppressed.

(4) The overhanging dimension of the overhang portion from the side edge of the one rising portion may be increased toward the central side from the rising proximal side and the rising distal side. In this way, because the overhang portion has a shape conforming to the shape of the other rising portion at the time of warping deformation, the development of a gap in the seam between the one and the other rising portions is made more difficult to occur. Thus, uneven brightness can be more reliably suppressed.

(5) At least the rising distal side portion of the overhang portion may be bow-shaped. When the reflection member is in the expanded state prior to raising the rising portions from the bottom portion, the interval between the other rising portion and the one rising portion is larger on the rising distal side than on the rising proximal side. Thus, the degree of freedom of setting the shape of the rising distal side portion of the overhang portion is relatively high compared to the rising proximal side portion. Thus, the rising distal side portion can be formed in a bow shape which is more similar to the shape of the other rising portion at the time of warping deformation. Accordingly, the development of a gap in the seam between the side edges of the one and the other rising portions can be made more difficult to occur. Therefore, uneven brightness can be more reliably suppressed.

(6) At least the rising distal side portion and the rising proximal side portion of the overhang portion may be bow-shaped. In this way, the overhang portion has a shape more closely conforming to the shape of the other rising portion at the time of warping deformation. Thus, the development of a gap in the seam can be appropriately prevented, and uneven brightness can be more suitably prevented.

(7) The overhang portion may be bow-shaped along the entire length thereof. In this way, the overhang portion has a shape more closely conforming to the shape of the other rising portion at the time of warping deformation. Thus, the development of a gap in the seam can be more appropriately prevented, and uneven brightness can be more appropriately prevented.

(8) The overhang portion may have a symmetric shape such that the rising proximal side portion and the rising distal side portion have the same overhanging dimension from the side edge of the one rising portion. In this way, the designing and dimension management of the reflection member can be facilitated, thus providing a manufacturing advantage.

(9) The rising distal side portion of the overhang portion may be bow-shaped, and the rising proximal side portion of the overhang portion may be triangular. When the reflection member is in the expanded state prior to raising the rising portions from the bottom portion, the interval between the other rising portion and the one rising portion is smaller on the rising proximal side than on the rising distal side. Thus, by forming the rising proximal side portion of the overhang portion in a triangular shape and minimizing the overhanging dimension of the rising proximal side portion, the overhang portion can be formed without affecting the outer shape of the adjacent other rising portion. Accordingly, the reflection member can be manufactured appropriately.

(10) The overhang portion may overhang in the direction from the bottom portion to the other rising portion beyond a surface of the other rising portion on a side opposite to the light output side. In this way, the overhanging dimension of the overhang portion can be set such that the overhang portion can be maintained in a contacted state with respect to the side edge of the other rising portion even when the other rising portion is subjected to a maximum warping deformation, for example. Thus, the development of a gap in the seam between the adjacent rising portions can be reliably prevented, and uneven brightness can be reliably prevented.

(11) The overhang portion may be formed along the entire length of the side edge of the one rising portion. In this way, the development of a gap can be prevented along the entire length between the overhang portion and the side edge of the other rising portion. Therefore, uneven brightness can be more appropriately suppressed.

(12) The rising portions may be inclined with respect to the bottom portion. In this way, light can be reflected by the rising portions toward the light output side while the light is appropriately angled.

(13) The chassis may include a side plate rising from the bottom plate and facing the rising portions with a space provided therebetween. In this way, even when the other rising portion is displaced into the space provided between the other rising portion and the side plate due to warping deformation, the development of a gap in the seam can be prevented by the overhang portion. Thus, the leakage of light can be prevented. Further, the overhang portion overhanging from the side edge of the one rising portion may be disposed in the space between the side plate and the other rising portion.

(14) The light source may be an LED. In this way, high brightness can be obtained and power consumption can be reduced.

(15) A plurality of LEDs may be mounted on a LED board parallel to the bottom plate and the bottom portion. When the plurality of LEDs is mounted on the LED board, in order to dispose more LEDs near the seam according to a conventional technology, the LEDs need to be unevenly distributed on the LED board, which requires the manufacture of a special LED board, with the result of higher cost. In this respect, by forming the overhang portion on the side edge of the one rising portion of the reflection member as described above, the need for utilizing such conventional technology can be eliminated. Thus, a general-purpose LED board on which LEDs are mounted regularly, for example, can be used. Thus, more cost reduction can be achieved.

(16) A diffuser lens may be disposed on the light output side with respect to the LED, the diffuser lens being configured to output light from the LED in a diffused manner. In this way, the light emitted from the LED can be output while being diffused by the diffuser lens. Therefore, the development of unevenness in the output light can be made difficult to occur. Thus, the number of the LEDs to be installed can be reduced and cost reduction can be achieved.

(17) The lighting device may further include an optical member disposed on the light output side with respect to the light source. The chassis may include, in a portion thereof facing the optical member, a light source disposed area in which the light source is disposed, and a light source non-disposed area in which the light source is not disposed. The optical member may include a portion overlapping with the light source disposed area and a portion overlapping with the light source non-disposed area. The light reflectance of at least a surface of the portion overlapping with the light source disposed area that faces the light source may be larger than the light reflectance of at least a surface of the portion overlapping with the light source non-disposed area that faces the light source. In this way, the light emitted from the light source initially reaches the portion of the optical member having the relatively large light reflectance, where a large amount of the light is reflected (not transmitted). Thus, the brightness of illumination light is suppressed relative to the amount of light emitted from the light source. On the other hand, the reflected light is reflected by the reflection member in the chassis and thereby caused to reach the light source non-disposed area. Because the portion of the optical member overlapping with the light source non-disposed area has relatively small light reflectance, the portion transmits a larger amount of light, thereby providing a predetermined brightness of the illumination light.

(18) The portion of the chassis facing the optical member may include at least a first end portion, a second end portion positioned in an end portion opposite to the first end portion, and a central portion sandwiched between the first end portion and the second end portion. The central portion corresponds to the light source disposed area, and the first end portion and the second end portion correspond to the light source non-disposed area. In this way, sufficient brightness can be ensured in the central portion of the lighting device. Therefore, sufficient brightness can be also ensured in the display central portion of a display device provided with the lighting device. Thus, good visibility can be obtained.

(19) The light source may be a cold cathode tube. In this way, longer operating life can be achieved and light control can be easily performed.

(20) The light source may be a hot cathode tube. In this way, high brightness can be achieved.

Next, to solve the above problem, a display device of the present invention includes the lighting device described above and a display panel configured to provide a display by using the light from the lighting device.

According to such display device, because the lighting device supplying light to the display panel can suppress uneven brightness at low cost, a display having high display quality can be realized at low cost.

The display panel may include a liquid crystal panel. The display device as a liquid crystal display device may be applied to various purposes, including displays for television and personal computers, and is particularly suitable for large screens.

Advantageous Effect of the Invention

According to the present invention, uneven brightness can be suppressed at low cost.

BRIEF DESCRIPTION OF THE DRAWINGS

FIG. 1 is an exploded perspective view illustrating a schematic configuration of a television receiver according to a first embodiment of the present invention;

FIG. 34 is a plan view illustrating an arrangement of a cold cathode tube and the reflection sheet in the chassis according to a third embodiment of the present invention.

BEST MODE FOR CARRYING OUT THE INVENTION

<First Embodiment>

Figure 2:
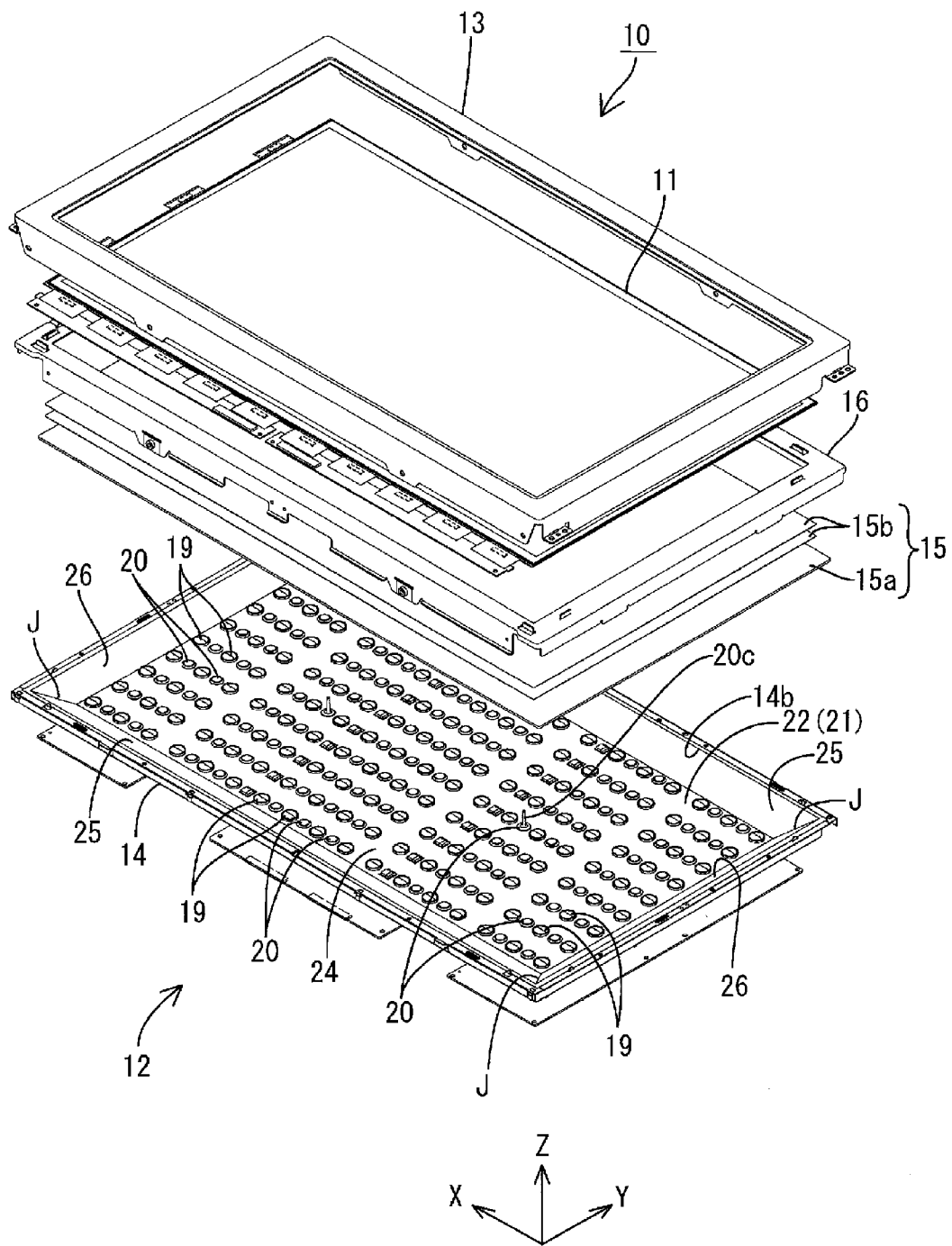
FIG. 2 is an exploded perspective view illustrating a schematic configuration of a liquid crystal display device included in the television receiver.

A first embodiment of the present invention will be described with reference to FIGS. 1 to 15. According to the present embodiment, a liquid crystal display device 10 will be described by way of example. In parts of the drawings, an X-axis, a Y-axis, and a Z-axis are drawn, and the directions of the respective axes correspond to the directions illustrated in the drawings. An upper side and a lower side of FIGS. 3 and 4 correspond to a front side and a back side, respectively.

As illustrated in FIG. 1, a television receiver TV according to the present embodiment includes the liquid crystal display device 10, front and rear cabinets Ca and Cb sandwiching and housing the liquid crystal display device 10 therebetween, a power supply P, a tuner T, and a stand ST. The liquid crystal display device (display device) 10 has a horizontally long (elongated) square (rectangular or oblong) shape as a whole, and is housed in a vertically disposed manner. As illustrated in FIG. 2, the liquid crystal display device 10 includes a liquid crystal panel 11 as a display panel, and a backlight unit (lighting device) 12 as an external light source. The liquid crystal panel 11 and the backlight unit 12 are integrally retained by a frame-like bezel 13, for example.

Next, the liquid crystal panel 11 and the backlight unit 12 constituting the liquid crystal display device 10 will be described in order. Of these, the liquid crystal panel (display panel) 11 has a horizontally long square shape in plan view, and includes a pair of glass substrates fixed to each other through a predetermined gap, with liquid crystal enclosed therebetween. One of the glass substrates is provided with switching components (such as TFTs) connected to source wiring and gate wiring that are orthogonal to each other, pixel electrodes connected to the switching components, an alignment film, or the like. The other glass substrate is provided with color filters including colored portions of, for example, R (red), G (green), and B (blue) that are disposed in predetermined arrangements, counter electrodes, an alignment film, or the like. On the outer sides of the substrates, polarizing plates are disposed.

Next, the backlight unit 12 will be described in detail. The backlight unit 12, as illustrated in FIG. 2, includes: a substantially box-shaped chassis 14 having an opening 14b on a light output surface side (the side of the liquid crystal panel 11); a group of optical members 15 (including a diffuser plate (light diffuser member) 15a and a plurality of optical sheets 15b disposed between the diffuser plate 15a and the liquid crystal panel 11) disposed so as to cover the opening 14b of the chassis 14; and a frame 16 disposed along outer edge portions of the chassis 14 and holding the group of optical members 15 by sandwiching outer edge portions of the optical members 15 between the frame 16 and the chassis 14. Further, the chassis 14 is provided with: LEDs 17 (Light Emitting Diodes) as the light source; LED boards 18 on which the LEDs 17 are mounted; and diffuser lenses 19 disposed on the LED boards 18 at positions corresponding to the LEDs 17. The chassis 14 is also provided with: holding members 20 configured to hold the LED boards 18 between the holding members 20 and the chassis 14; and a reflection sheet 21 reflecting light in the chassis 14 toward the optical members 15. In the backlight unit 12, the side of the optical members 15 with respect to the LEDs 17 corresponds to a light output side. In the following, the constituent components of the backlight unit 12 will be described in detail.

Figure 3:
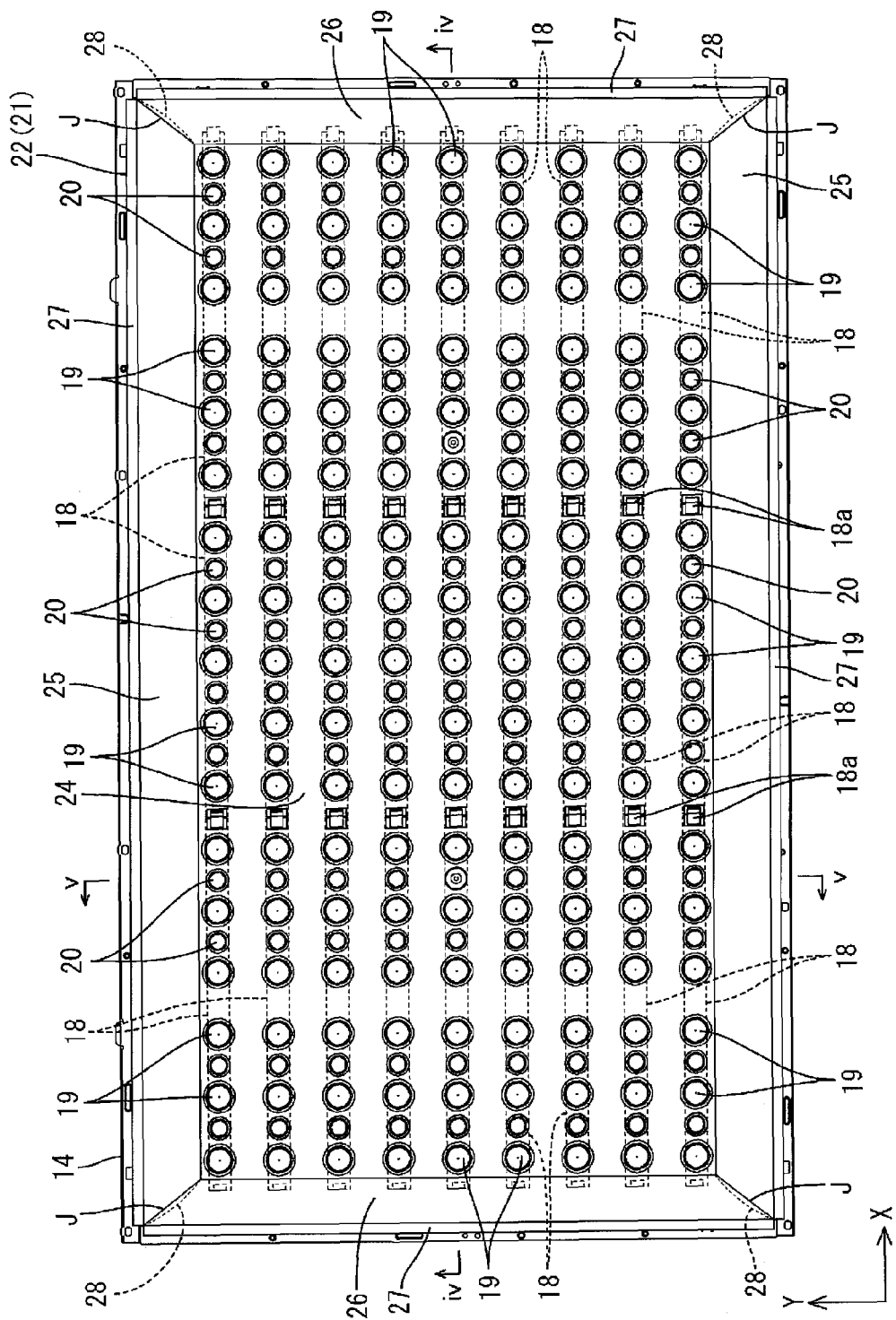
FIG. 3 is a plan view illustrating an arrangement of a LED board, a first reflection sheet, and a holding member in a chassis of the liquid crystal display device.
Figure 4:
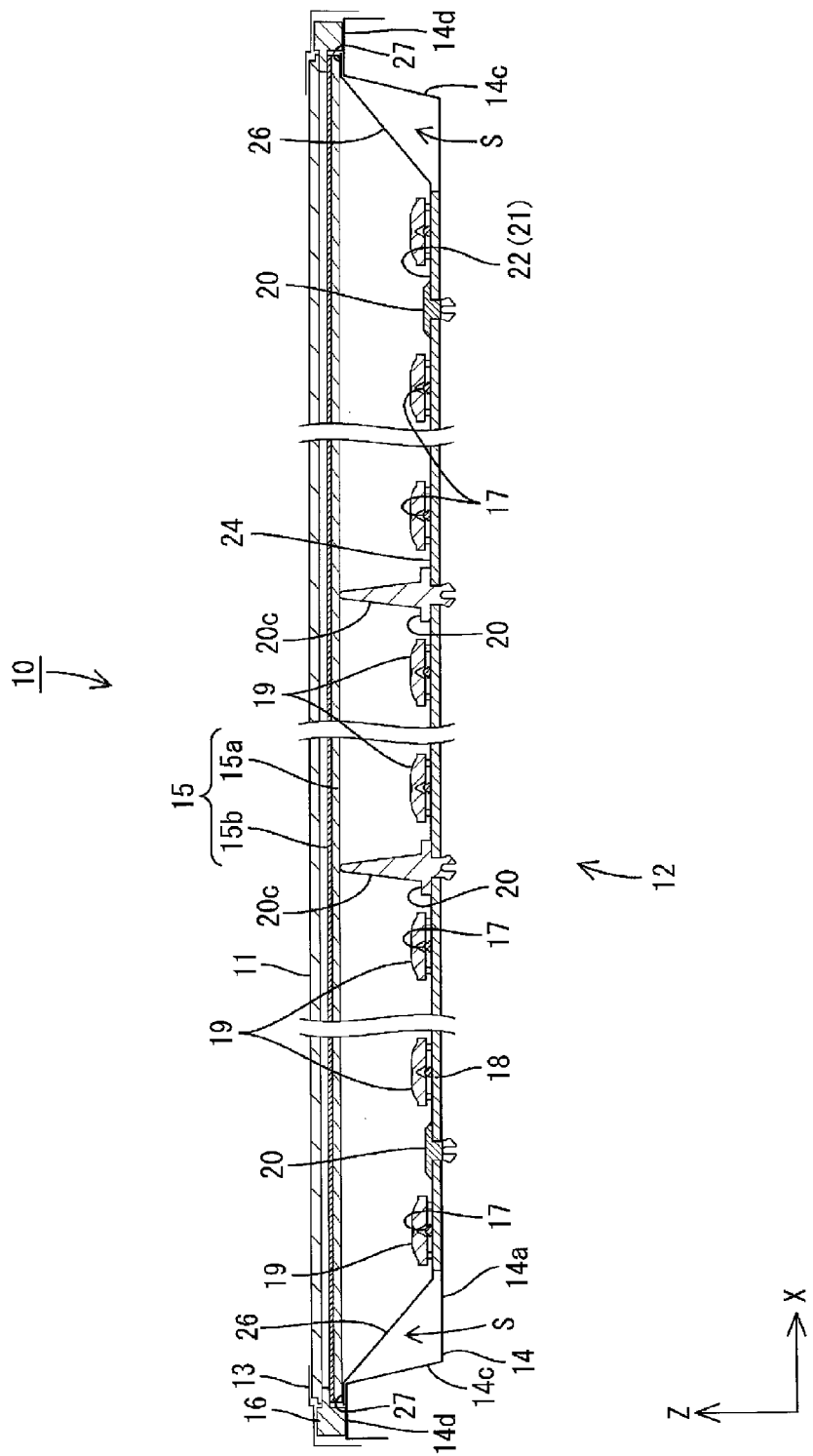
FIG. 4 is a cross sectional view illustrating the liquid crystal display device taken along line iv-iv of FIG. 3.
Figure 5:
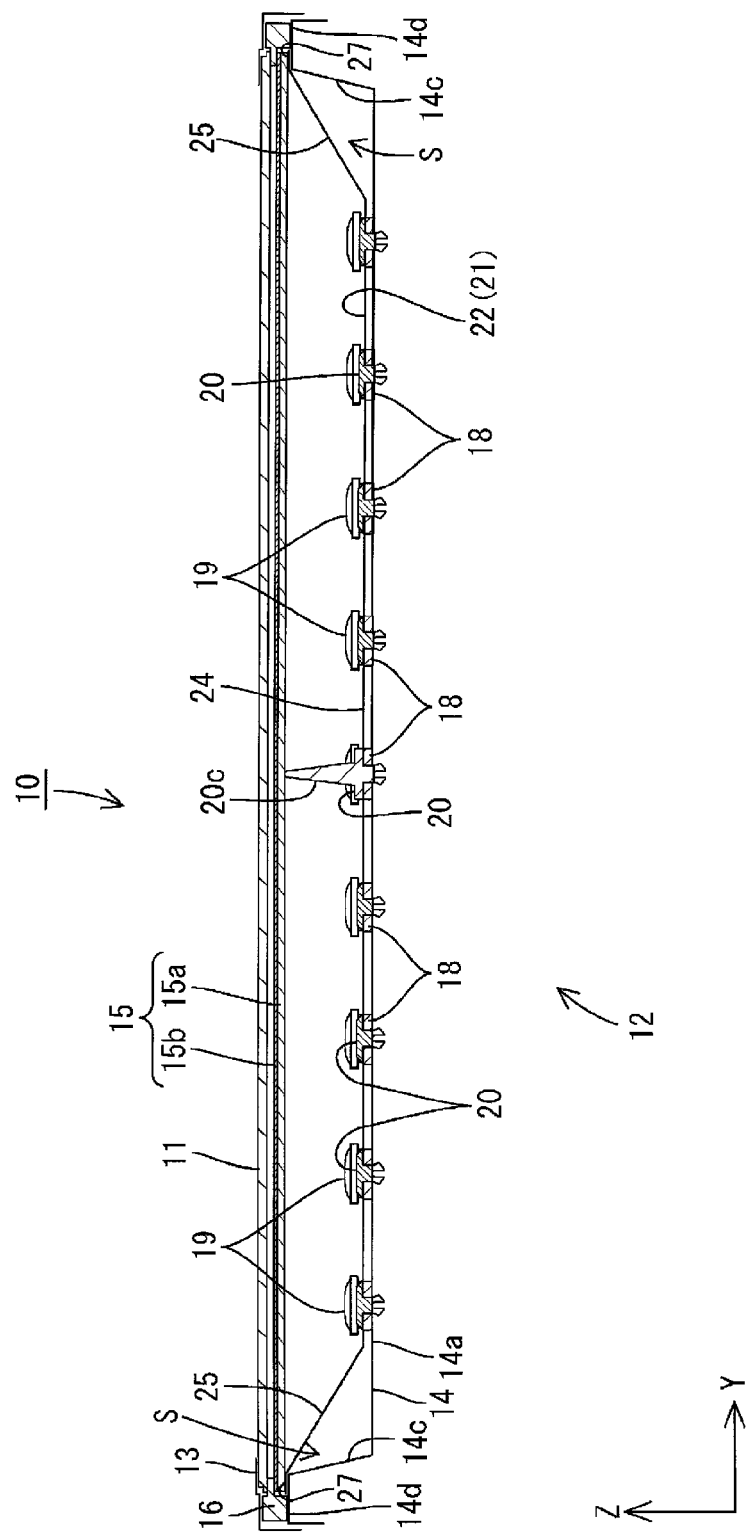
FIG. 5 is a cross sectional view illustrating the liquid crystal display device taken along line v-v of FIG. 3.

As illustrated in FIGS. 3 to 5, the chassis 14 made of a metal and includes: a bottom plate 14a having a horizontally long square shape (rectangle or oblong shape) similar to the liquid crystal panel 11; side plates 14c rising from outer ends of the sides (a pair of long sides and a pair of short sides) of the bottom plate 14a toward the front side (light output side); and receiving plates 14d extending outward from rising ends of the side plates 14c. As a whole, the chassis 14 has a shallow, substantially box-like shape (substantially shallow dish shape) that is opened toward the front side. A long side direction of the chassis 14 corresponds to the X-axis direction (horizontal direction), and a short side direction of the chassis 14 corresponds to the Y-axis direction (vertical direction). On the receiving plates 14d of the chassis 14, the frame 16 and the optical members 15, which will be described later, can be mounted from the front side. The frame 16 may be attached to the receiving plates 14d by screws. The bottom plate 14a of the chassis 14 includes attaching holes 14e attaching the holding members 20. Specifically, a plurality of attaching holes 14e are distributed on the bottom plate 14a at positions corresponding to the positions of the holding members 20 to be attached.

Figure 7:
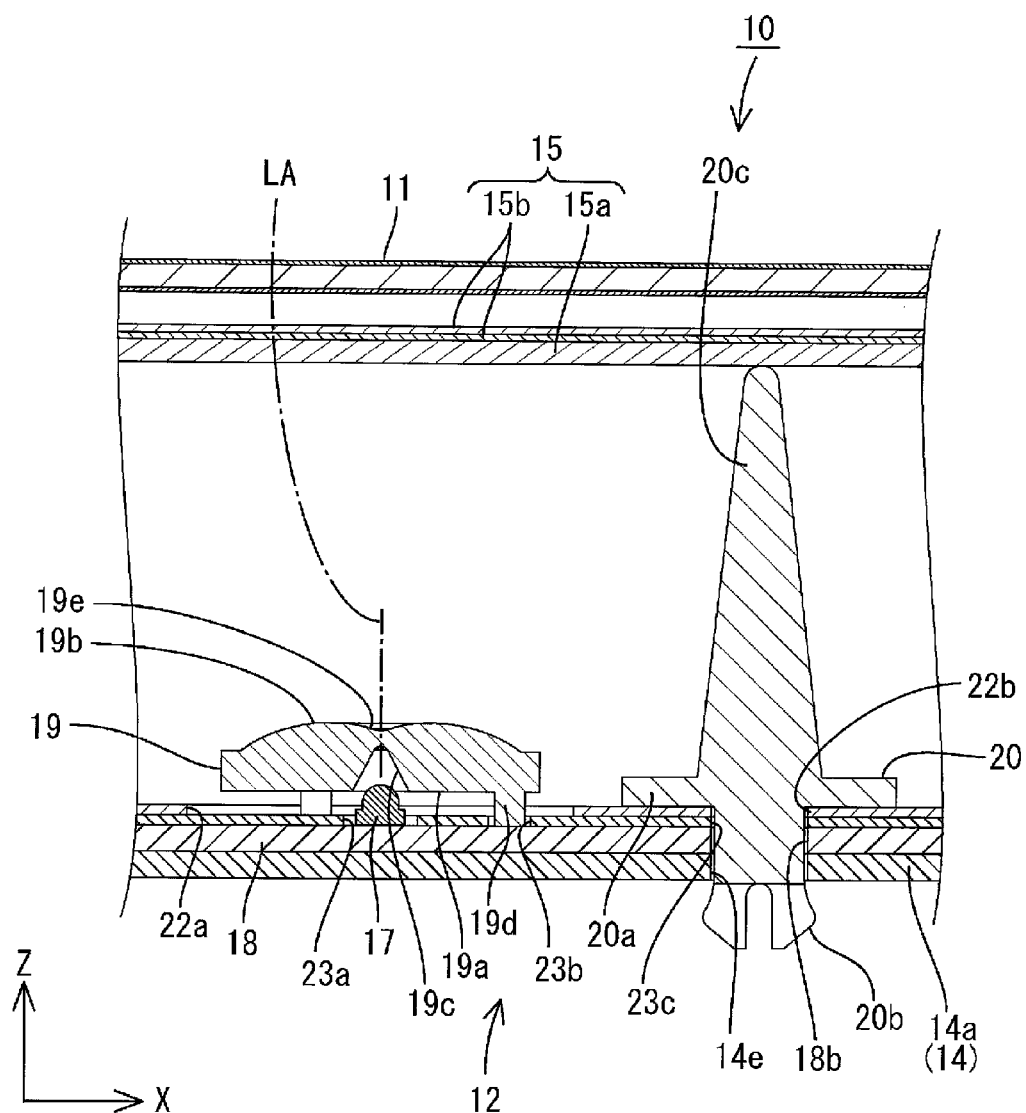
FIG. 7 is a cross sectional view taken along line vii-vii of FIG. 6.
Figure 8:
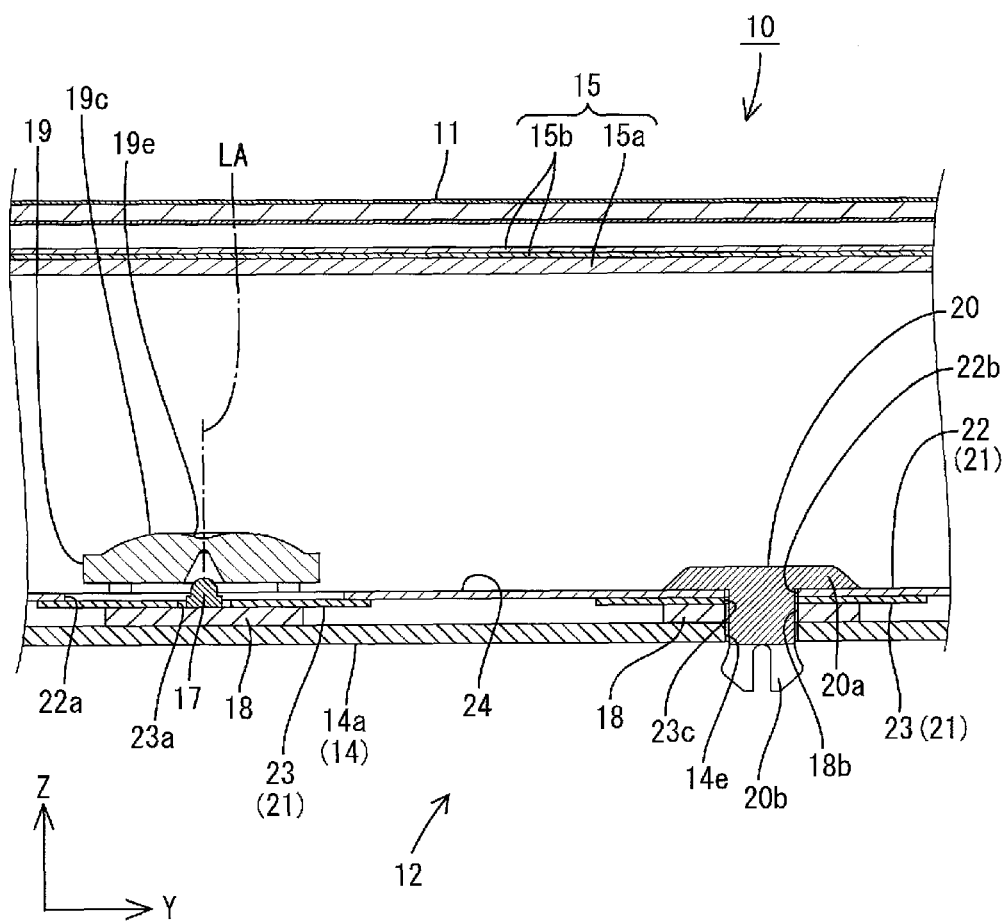
FIG. 8 is a cross sectional view taken along line viii-viii of FIG. 6.

As illustrated in FIG. 2, the optical members 15 have a horizontally long square (rectangular) shape in plan view, similar to the liquid crystal panel 11 and the chassis 14. As illustrated in FIG. 3, the optical members 15 cover the opening 14b of the chassis 14 by having the outer edge portions of the optical members 15 placed on the receiving plates 14d. Specifically, the optical members 15 are disposed between the liquid crystal panel 11 and the LEDs 17. The optical members 15 include the diffuser plate 15a disposed on the back side (on the side of the LEDs 17; opposite to the light output side), and the optical sheets 15b disposed on the front side (the side of the liquid crystal panel 11; the light output side). The diffuser plate 15a includes a substantially transparent resin base substrate and having a predetermined thickness in which a number of diffusing particles are dispersed, and provides the function of diffusing the light transmitted therethrough. The optical sheets 15b have a sheet form with a smaller plate thickness than the diffuser plate 15a, and include a layer of two sheets (FIGS. 7 and 8). Specific types of the optical sheets 15b include a diffuser sheet, a lens sheet, and a reflection type polarizing sheet, for example, which may be selected appropriately for use.

As illustrated in FIG. 2, the frame 16 has a frame shape conforming to the outer peripheral edges of the liquid crystal panel 11 and the optical members 15. Between the frame 16 and the respective receiving plates 14d, the outer edge portions of the optical members 15 can be sandwiched (FIGS. 4 and 5). The frame 16 is also configured to receive the outer edge portions of the liquid crystal panel 11 from the back side. Thus, the outer edge portions of the liquid crystal panel 11 can be held between the frame 16 and a bezel 13 disposed on the front side (FIGS. 4 and 5).

Next, the LEDs 17 and the LED boards 18 on which the LEDs 17 are mounted will be described. The LEDs 17 may include LED chips sealed on a board portion fixed on the LED boards 18 using a resin material, as illustrated in FIGS. 7 and 8. The LED chip mounted on the board portion has a one type of dominant emission wavelength. Specifically, an LED chip emits a single color light of blue. The resin material to seal the LED chips may include a dispersion of a phosphor that converts the blue light emitted from the LED chips into white light. Thus, the LEDs 17 can emit white light. The LEDs 17 are of the so-called "top type" having a light emitting surface on the side (facing the optical members 15) opposite to the mounting side with respect to the LED boards 18.

As illustrated in FIGS. 3 and 4, the LED boards 18 include a horizontally long square shaped base member in plan view. The LED boards 18 extend along the bottom plate 14a and are housed in the chassis 14 in a state where the long-side direction thereof aligned with the X-axis direction and the short-side direction thereof aligned with the Y-axis direction. The base member of the LED boards 18 may be made of the same metal material as that of the chassis 14, such as an aluminum material, with a wire pattern of a metal film such as a copper foil, formed on a surface of the base member through an insulating layer. The material of the base member of the LED boards 18 may include an insulating material such as ceramic. On one of the plate surfaces of the base member of the LED boards 18 that faces the front side (i.e., the surface facing the optical members 15), the LEDs 17 having the above-described configuration are surface-mounted. A plurality of the LEDs 17 are disposed linearly parallel along the long side direction (X-axis direction) of the LED boards 18 and are connected in series by the wire pattern formed on the LED boards 18. The LEDs 17 are arranged at substantially constant pitches; namely, the LEDs 17 are disposed at regular intervals. At both of the end portions of the LED boards 18 in the long side direction, connector portions 18a are provided.

As illustrated in FIG. 3, a plurality of the LED boards 18 having the above-described configuration are disposed parallel to each other in the chassis 14 along each of the X-axis direction and the Y-axis direction, with their long side directions and short side directions aligned with each other. Namely, the LED boards 18 and the LEDs 17 mounted thereon are arranged in rows and columns (i.e., in a matrix shape in plan view) in the chassis 14, with their X-axis directions (the long side direction of the chassis 14 and the LED boards 18) corresponding to a row direction and their Y-axis directions (the short side direction of the chassis 14 and the LED boards 18) corresponding to a column direction. Specifically, the LED boards 18 include three in each row in the X-axis direction and nine in each column in the Y-axis direction for a total of 27 boards arranged side by side in the chassis 14. The LED boards 18 arranged in the X-axis direction constituting each row are mutually electrically connected via fitting connection of their adjacent connector portions 18a. In addition, the connector portions 18a corresponding to the ends of the chassis 14 in the X-axis direction electrically connected to an external control circuit, which is not illustrated. Thus, the LEDs 17 disposed on the LED boards 18 constituting each row are connected in series. In addition, a number of the LEDs 17 contained in each row can be turned on or off at once by a single control circuit. Therefore, cost can be reduced. The LED boards 18 may be arranged at substantially equal pitches in the Y-axis direction. Thus, the LEDs 17 arranged two-dimensionally along the bottom plate 14a in the chassis 14 may be described as being arranged at substantially regular intervals with respect to the X-axis direction and the Y-axis direction.

Figure 6:
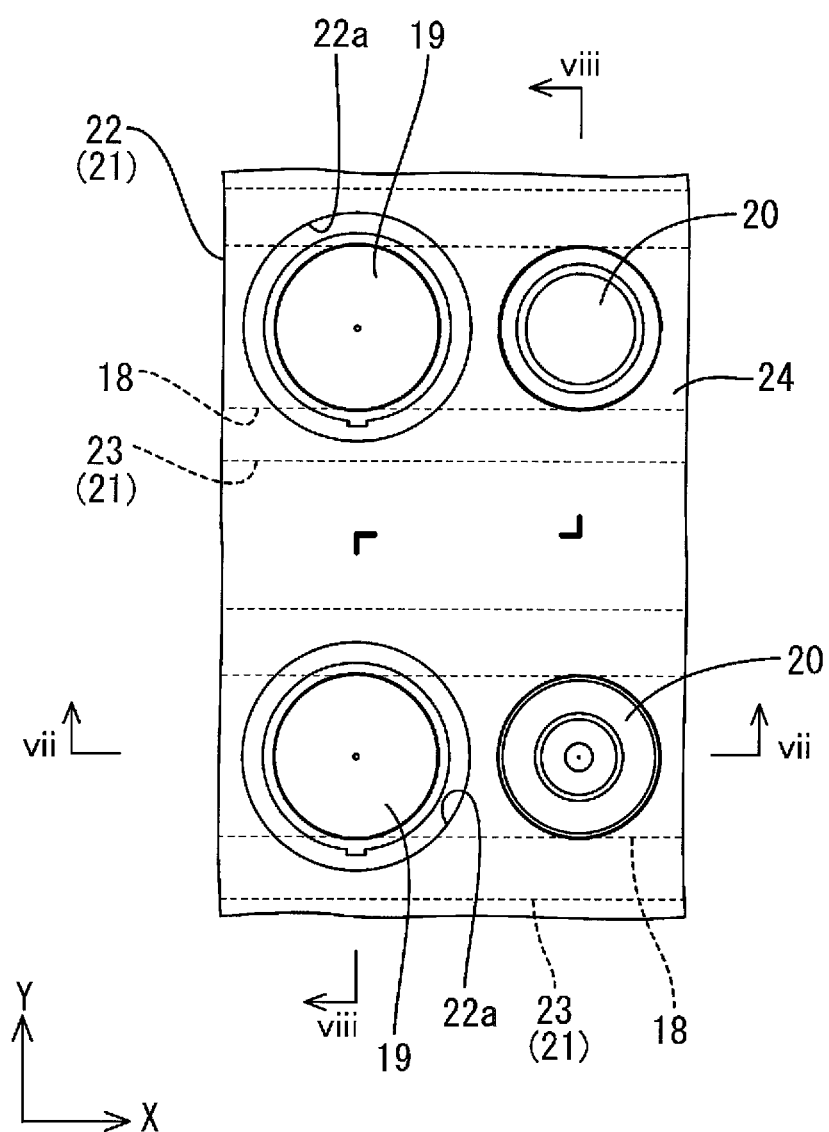
FIG. 6 is a plan view illustrating a detailed arrangement of the LED board and the holding member.

The diffuser lenses 19 may be formed of a substantially transparent (i.e., highly light transmissive) synthetic resin material having a higher refractive index than that of air (such as polycarbonate or acrylic). As illustrated in FIGS. 6 to 8, the diffuser lenses 19 have a predetermined thickness and are formed in a substantially circular shape in plan view. The diffuser lenses 19 are attached to the LED boards 18 so as to cover the LEDs 17 individually from the front side; i.e., so as to overlap with the LEDs 17 in plan view. The diffuser lenses 19 are configured to output the highly directional light emitted from the LEDs 17 while diffusing the light. Specifically, since the light emitted from the LEDs 17 is made less directional as it passes through the diffuser lenses 19, the areas between the adjacent LEDs 17 can be prevented from being visually recognized as dark areas even when the interval between the LEDs 17 is increased. Thus, the number of the LEDs 17 to be installed can be decreased. The diffuser lenses 19 are disposed at positions substantially concentric with the LEDs 17 in plan view.

The diffuser lenses 19 include a light incident surface 19a opposing to the back side and facing the LED boards 18 (LEDs 17) on which the light from the LEDs 17 is incident, and a light output surface 19b opposing to the front side and facing the optical members 15 from which the light is output. As illustrated in FIGS. 7 and 8, the light incident surfaces 19a as a whole are arranged parallel to each other along the plane of the LED boards 18 (i.e., along the X-axis direction and the Y-axis direction) and also include a light incident side concave portion 19c in an area overlapping with the LEDs 17 in plan view, the light incident side concave portion 19c providing an inclined surface inclined with respect to an optical axis LA of the LEDs 17. The light incident side concave portion 19c has a substantially conical shape with an inverted-V cross section, and is disposed at a substantially concentric position with respect to the diffuser lenses 19. The light emitted from the LEDs 17 that has entered the light incident side concave portion 19c is refracted at wide angles by the inclined surface as the light becomes incident on the diffuser lenses 19. From the light incident surface 19a, attachment leg portions 19d as attachment structures protrude with respect to the LED boards 18. The light output surface 19b has a flat, substantially spherical shape, which enables output of the light exited from the diffuser lenses 19 while refracting the light at a wide angle. In an area of the light output surface 19b that overlaps with the LEDs 17 in plan view, a substantially bowl-shaped light output side concave portion 19e is formed. The light output side concave portion 19e enables most of the light from the LEDs 17 to be refracted at wide angles as the light is output, or enables some of the light from the LEDs 17 to be reflected back toward the LED boards 18, for example.

Next, the holding members 20 will be described. The holding members 20 may be made of a synthetic resin such as polycarbonate and have a white surface so as to exhibit high light reflectivity. As illustrated in FIGS. 6 to 8, the holding members 20 include a body portion 20a extending along the plane of the LED boards 18, and a fixing portion 20b protruding from the body portion 20a toward the back side, i.e., toward the chassis 14, and fixed to the chassis 14. The body portion 20a has a substantially circular plate shape in plan view and is configured to sandwich the LED boards 18 and the reflection sheet 21, which will be described later, with the bottom plate 14a of the chassis 14. The fixing portion 20b extends through insertion holes 18b and the attaching holes 14e formed in the LED boards 18 and the bottom plate 14a of the chassis 14, respectively, at positions corresponding to the attached positions of the holding members 20. The fixing portion 20b can be locked on the bottom plate 14a. As illustrated in FIG. 3, a number of the holding members 20 are arranged in rows and columns and parallel to each other in the plane of the LED boards 18. Specifically, the holding members 20 are disposed at positions between the diffuser lenses 19 (LEDs 17) that are adjacent to each other with respect to the X-axis direction.

A pair of the holding members 20 disposed at a central portion of the screen include support portions 20c protruding from the body portions 20a toward the front side, as illustrated in FIGS. 2 to 4. The support portions 20c support the diffuser plate 15a from the back side. Therefore, the LEDs 17 and the optical members 15 can be maintained in a constant positional relationship with respect to the Z-axis direction, thereby preventing inadvertent deformation of the optical members 15.

Next, the reflection sheet 21 will be described. The reflection sheet 21 includes a first reflection sheet 22 having a size such that the inner surface of the chassis 14 can be substantially entirely covered, and a second reflection sheet 23 having a size such that the LED boards 18 can be individually covered. The reflection sheets 22 and 23 may be both made of a synthetic resin and have white surfaces for high light reflectivity. The reflection sheets 22 and 23 both extend along the bottom plate 14a (LED boards 18) in the chassis 14.

The second reflection sheet 23 will be described. The second reflection sheet 23, as illustrated in FIGS. 6 to 8, has a horizontally long square shape in plan view similar to the corresponding LED boards 18, and is configured to cover the entire areas of the LED boards 18 from the front side. The second reflection sheet 23 is disposed so as to overlap with the surfaces of the LED boards 18 on the front side while facing the diffuser lenses 19. Namely, the second reflection sheet 23 is disposed between the diffuser lenses 19 and the LED boards 18. Thus, the light returned from the side of the diffuser lenses 19 toward the side of the LED boards 18, or the light that entered into a space between the diffuser lenses 19 and the LED boards 18 from a space outside the diffuser lenses 19 in plan view can be caused to be reflected by the second reflection sheet 23 back toward the diffuser lenses 19. Thus, the efficiency of light utilization can be increased and thereby increased brightness can be obtained. In other words, sufficient brightness can be obtained even when the number of the LEDs 17 to be installed is reduced for reducing cost.

As illustrated in FIG. 8, the second reflection sheet 23 has a short side dimension larger than the LED boards 18 and larger than the diameters of the diffuser lenses 19 and lens insertion holes 22a of the first reflection sheet 22, which will be described later. Thus, edge portions of the lens insertion holes 22a of the first reflection sheet 22 can be disposed over the second reflection sheet 23 on the front side. Accordingly, the first reflection sheet 22 and the second reflection sheet 23 are disposed continuously and without gaps in plan view in the chassis 14. Thus, exposure of the chassis 14 or the LED boards 18 on the front side through the lens insertion holes 22a is virtually eliminated. Therefore, light in the chassis 14 can be efficiently reflected toward the optical members 15, thus contributing to an increase in brightness. Further, the second reflection sheet 23 includes LED insertion holes 23a inserting the LEDs 17, leg portion insertion holes 23b inserting the attachment leg portions 19d of the diffuser lenses 19, and insertion holes 23c inserting the fixing portions 20b of the holding members 20, at respectively overlapping positions in plan view.

Next, the first reflection sheet 22 will be described in detail. As illustrated in FIG. 3, of the first reflection sheet 22, most of the central portion extending along the bottom plate 14a of the chassis 14 provides the bottom portion 24. The bottom portion 24 has a horizontally long (elongated) square shape (rectangle or oblong shape) similar to the bottom plate 14a of the chassis 14, with a long side direction aligned with the X-axis direction and a short side direction aligned with the Y-axis direction. The bottom portion 24 has the lens insertion holes 22a allowing the insertion of the LEDs 17 and the diffuser lenses 19 covering the LEDs 17 in the chassis 14. A plurality of the lens insertion holes 22a are arranged in a matrix and parallel to each other at positions overlapping with the LEDs 17 and the diffuser lenses 19 in plan view in the bottom portion 24. The lens insertion holes 22a, as illustrated in FIG. 6, are circular in plan view, with a diameter larger than the diffuser lenses 19. Thus, when the first reflection sheet 22 is placed in the chassis 14, the diffuser lenses 19 can be reliably passed through the lens insertion holes 22a regardless of the presence or absence of dimension errors. As illustrated in FIG. 3, the first reflection sheet 22 covers the areas between the adjacent diffuser lenses 19 and outer peripheral areas in the chassis 14. Thus, the light toward these areas can be reflected by the first reflection sheet 22 toward the optical members 15. Further, in the bottom portion 24 of the first reflection sheet 22, the insertion holes 22b inserting the fixing portions 20b of the holding members 20 are formed at positions overlapping with the fixing portions 20b in plan view.

As illustrated in FIGS. 3 to 5, a pair of first rising portions (one rising portion) 25 rises from a pair of long sides of the bottom portion 24 of the first reflection sheet 22 toward the front side (light output side). A pair of second rising portions (other rising portion) 26 rises from a pair of short sides of the bottom portion 24 of the first reflection sheet 22, toward the front side (light output side). The first rising portions 25 protrude outward from the long sides of the bottom portion 24 along the Y-axis direction in plan view. In other words, the pair of the first rising portions 25 is disposed at positions sandwiching the bottom portion 24 with respect to the Y-axis direction. The second rising portions 26 protrude outward from the short sides of the bottom portion 24 along the X-axis direction in plan view. In other words, the pair of the second rising portions 26 is disposed at positions sandwiching the bottom portion 24 with respect to the X-axis direction. Each of the long sides of the bottom portion 24 is adjacent to the pair of the short sides, and each of the short sides of the bottom portion 24 is adjacent to the pair of the long sides. Thus, each of the first rising portions 25 rising from the long sides of the bottom portion 24 is adjacent to the pair of the second rising portions 26, and each of the second rising portions 26 rising from the short sides of the bottom portion 24 is adjacent to the pair of the first rising portions 25. The direction from the bottom portion 24 to the first rising portions 25 is aligned with the Y-axis direction, while the direction from the bottom portion 24 to the second rising portions 26 is aligned with the X-axis direction; namely, both the directions are from the central side (inner side) toward the outside of the first reflection sheet 22. The rising portions 25 and 26 include extension portions 27 extending outward from rising distal ends. The extension portions 27 are placed on the receiving plates 14d of the chassis 14 and sandwiched between the receiving plates 14d and the diffuser plate 15a.

Figure 9:
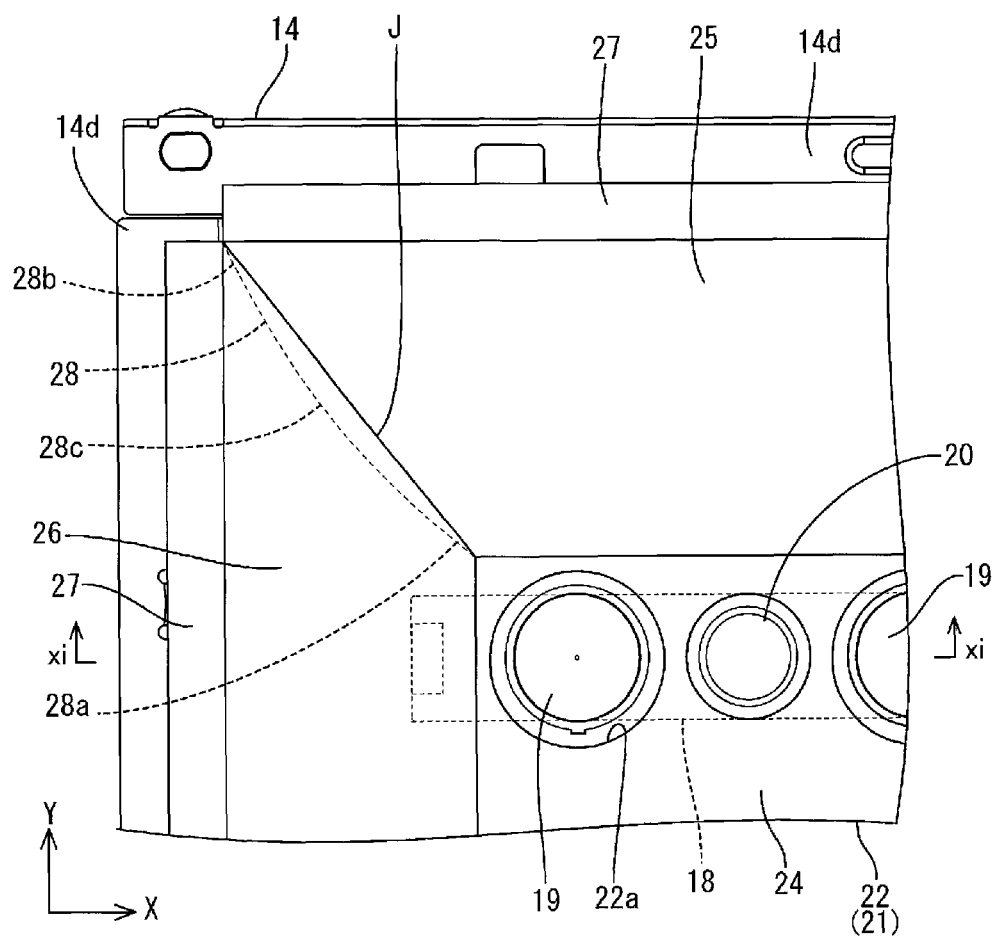
FIG. 9 is a plan view illustrating a detailed arrangement of a first rising portion, a second rising portion, and an overhang portion of the first reflection sheet.

The first rising portions 25 and the second rising portions 26 are inclined each at a predetermined rising angle with respect to the bottom portion 24. Thus, the first reflection sheet 22 may be described as being substantially bowl-shaped as a whole. The first rising portions 25 include side edges 25a which are abutted against side edges 26a of the adjacent second rising portions 26, thus forming seams J between the side edges 25a and the side edges 26a which are adjacent to each other. The seams J are formed between the side edges 25a and 26a of the adjacent rising portions 25 and 26; namely, at the four corners of the first reflection sheet 22 (FIG. 3). As illustrated in FIG. 9, the seams J are inclined with respect to both the X-axis direction and the Y-axis direction in plan view; namely, the seams J extend along the side edges 25a and 26a of the adjacent rising portions 25 and 26. The rising portions 25 and 26, the side plates 14c and bottom plate 14a of the chassis 14 define spaces S which are substantially triangular in side view (FIGS. 4 and 5). The spaces S have the inclined rising portions 25 and 26 as their oblique sides.

Figure 14:
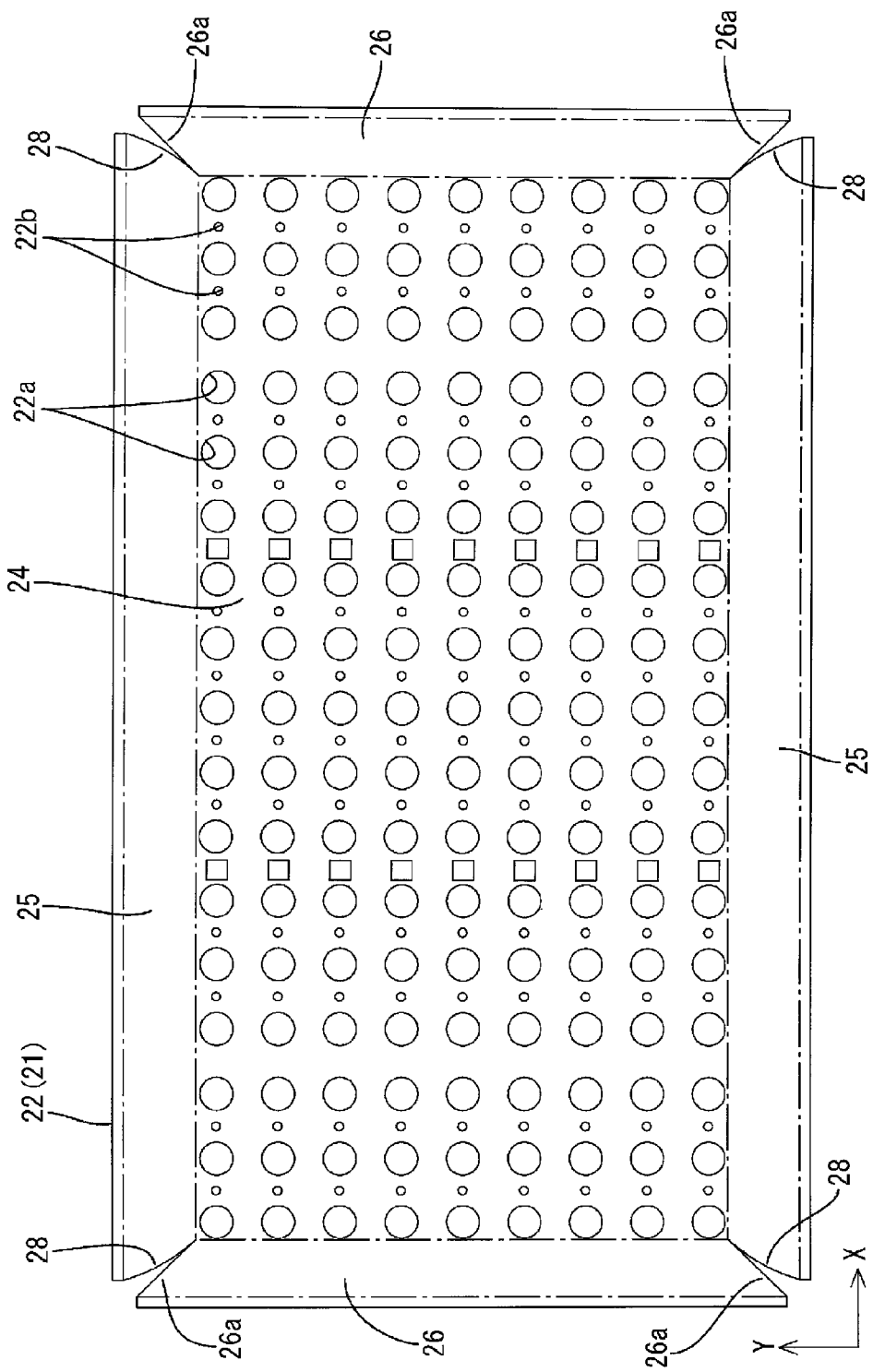
FIG. 14 is a plan view illustrating the first reflection sheet in an expanded state.
Figure 15:
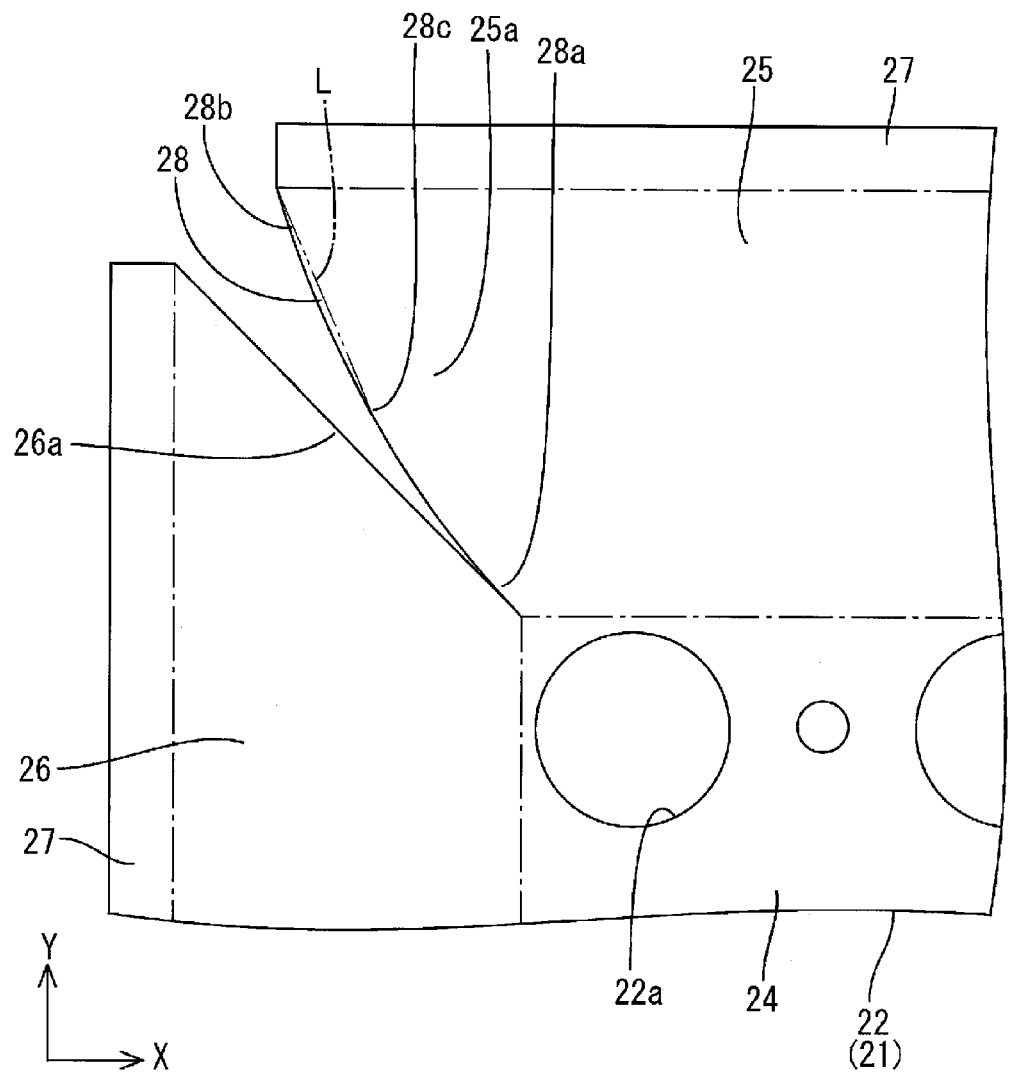
FIG. 15 is a planar cross sectional view illustrating a detailed relationship among the first rising portion, the second rising portion, and the overhang portion of the first reflection sheet in the expanded state.

The first reflection sheet 22 may be formed in the above-described shape by bending an expanded material at predetermined positions, which may be obtained by punching a large base material (not illustrated), in a manufacturing process. In the expanded state, the first rising portions 25 and the second rising portions 26 of the first reflection sheet 22 have a substantially trapezoidal shape in plan view, as illustrated in FIG. 14, with the upper bases (shorter sides) disposed on the inside and continuous with the sides of the bottom portion 24, and with the lower bases (longer sides) disposed on the outside and continuous with the extension portions 27. In this expanded state, the side edges 25a and 26a of the first rising portions 25 and the second rising portions 26 are inclined in plan view with respect to both the X-axis direction and the Y-axis direction. Further, between the side edges 25a and 26a of the first rising portions 25 and the second rising portions 26 that are adjacent to each other in the expanded state, a predetermined interval is provided. The interval is gradually increased from the rising proximal side (inner side) to the rising distal side (outside) in plan view, forming a substantially triangular shape. The first rising portions 25 are symmetric with respect to a line passing through the center thereof and extending along the Y-axis direction. The second rising portions 26 are symmetric with respect to a line passing through the center thereof and extending along the X-axis direction. The first reflection sheet 22 with the shape illustrated in FIGS. 4 and 5 can be obtained by bending the rising portions 25 and 26 from the above expanded state into a valley shape and a mountain shape at rising proximal positions and rising distal positions, respectively, along bending lines indicated by dashed lines in FIG. 14. In order to facilitate the bending operation, perforations may be formed along the bending lines during the manufacturing process.

Because the first reflection sheet 22 is a large component made of a synthetic resin with a high thermal expansion rate among the components of the backlight unit 12, it tends to have a large amount of expansion or contraction due to thermal expansion or thermal contraction. Particularly, in the bottom portion 24 of the first reflection sheet 22, the amount of expansion or contraction due to thermal expansion or thermal contraction is larger in the long side direction (X-axis direction) than in the short side direction (Y-axis direction). As a result, the second rising portions 26 rising from the short sides of the bottom portion 24 are subject to a relatively large displacement in the rising proximal position compared to the first rising portions 25 rising from the long sides of the bottom portion 24. On the other hand, the rising distal position of the second rising portions 26 is substantially fixed because the continuous extension portions 27 are sandwiched between the receiving plates 14d and the diffuser plate 15a. Thus, when thermal expansion is occurred in the first reflection sheet 22, the rising proximal position of the second rising portions 26, compared to the first rising portions 25, is greatly displaced outward in the X-axis direction and becomes closer to the rising distal side, such that the distance between the rising proximal position and the rising distal position is greatly reduced. This may result in a large amount of slack, leading to warping deformation in the shape of a bow, for example. When there is such warping deformation in the second rising portions 26, the side edges 26a may be displaced away from the side edges 25a of the first rising portions 25, resulting in a gap in the seams J. The gap in the seams J reflects no light and instead allows light to leak to the outside of the first reflection sheet 22. This may lead to the problem of local dark areas at the four corners of the light output surface of the backlight unit 12 as a whole where the seams J are provided, resulting in uneven brightness.

Figure 10:
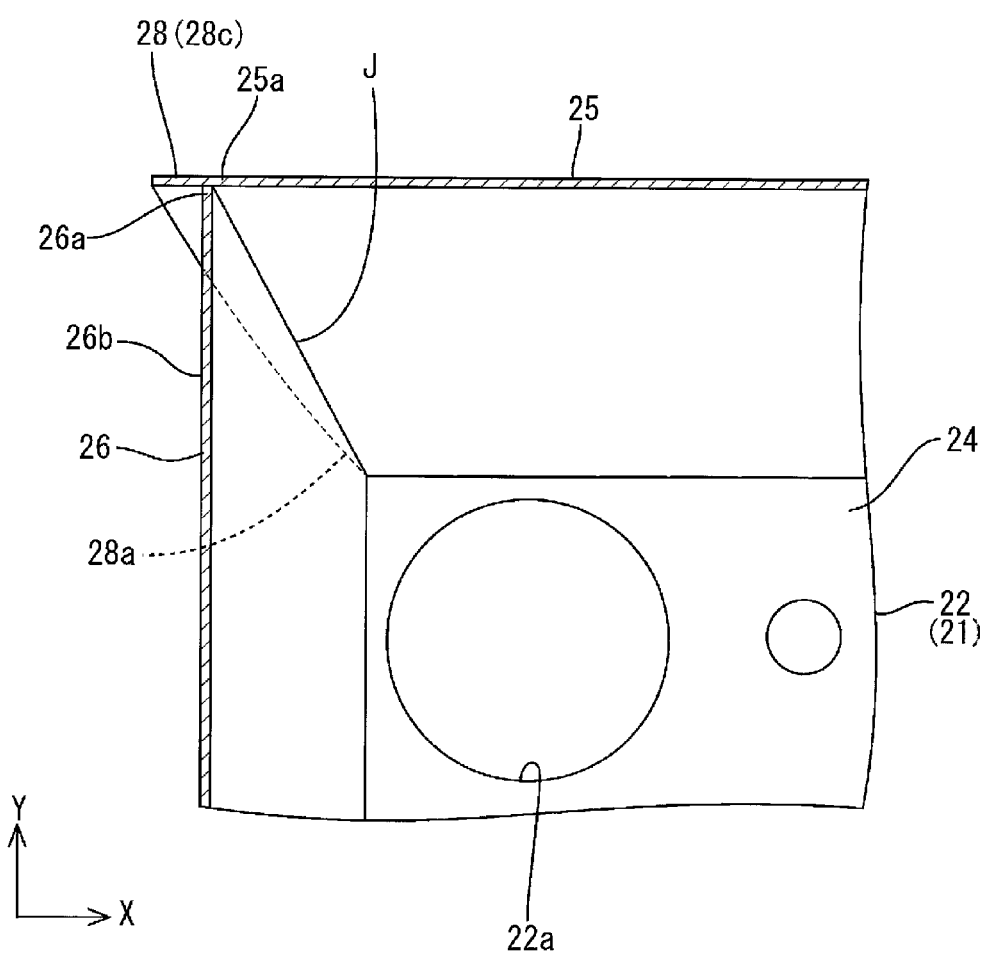
FIG. 10 is a planar cross sectional view illustrating a detailed relationship among the first rising portion, the second rising portion, and the overhang portion.
Figure 11:
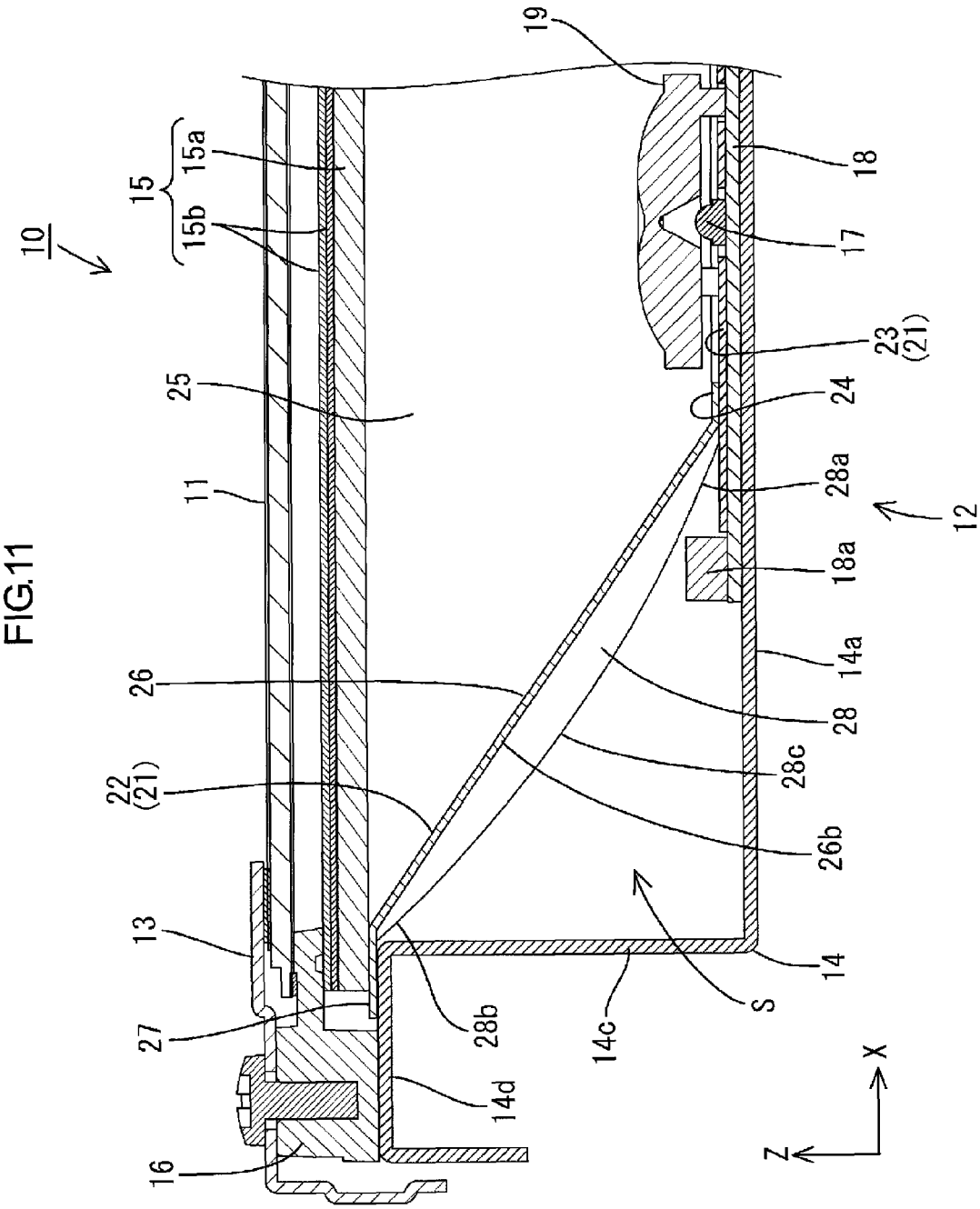
FIG. 11 is a cross sectional view taken along line xi-xi of FIG. 9.

Thus, in the first reflection sheet 22 according to the present embodiment, as illustrated in FIG. 9, overhang portions 28 are formed on the side edges 25a of the first rising portions 25 on the long sides. The overhang portions 28 overhang outward beyond the seams J along the X-axis direction (from the bottom portion 24 toward the second rising portions 26). The overhang portions 28 are formed on the side edges 25a of the pair of the first rising portions 25; namely, the overhang portions 28 are provided at the seams J formed at the four corners of the first reflection sheet 22 (FIG. 3). As illustrated in FIG. 10, end surfaces of the side edges 26a of the second rising portions 26 are abutted against inner surfaces of the overhang portions 28 (the surfaces facing the second rising portions 26), with the overhang portions 28 overhanging outward beyond outer surfaces 26b of the second rising portions 26 (the surfaces facing the side opposite to the light output side) in the X-axis direction. Thus, as illustrated in FIGS. 10 and 11, overhanging distal surfaces (outer end surfaces) of the overhang portions 28 are disposed between the outer surfaces 26b of the second rising portions 26 and the side plates 14c, generally within the spaces S provided between the second rising portions 26 and the side plates 14c. Thus, the bending of the overhang portions 28 in the middle, for example, can be prevented.

Figure 12:
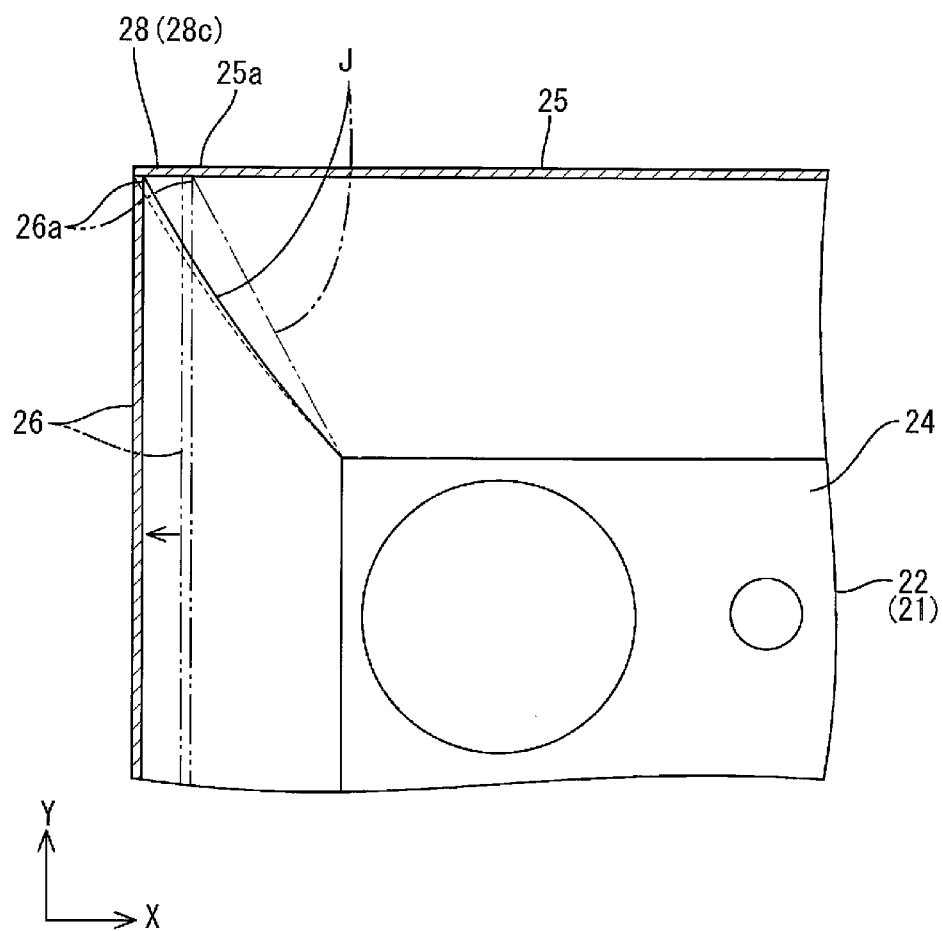
FIG. 12 is a planar cross sectional view illustrating a detailed relationship between the second rising portion subjected to warping deformation and the overhang portion.
Figure 13:
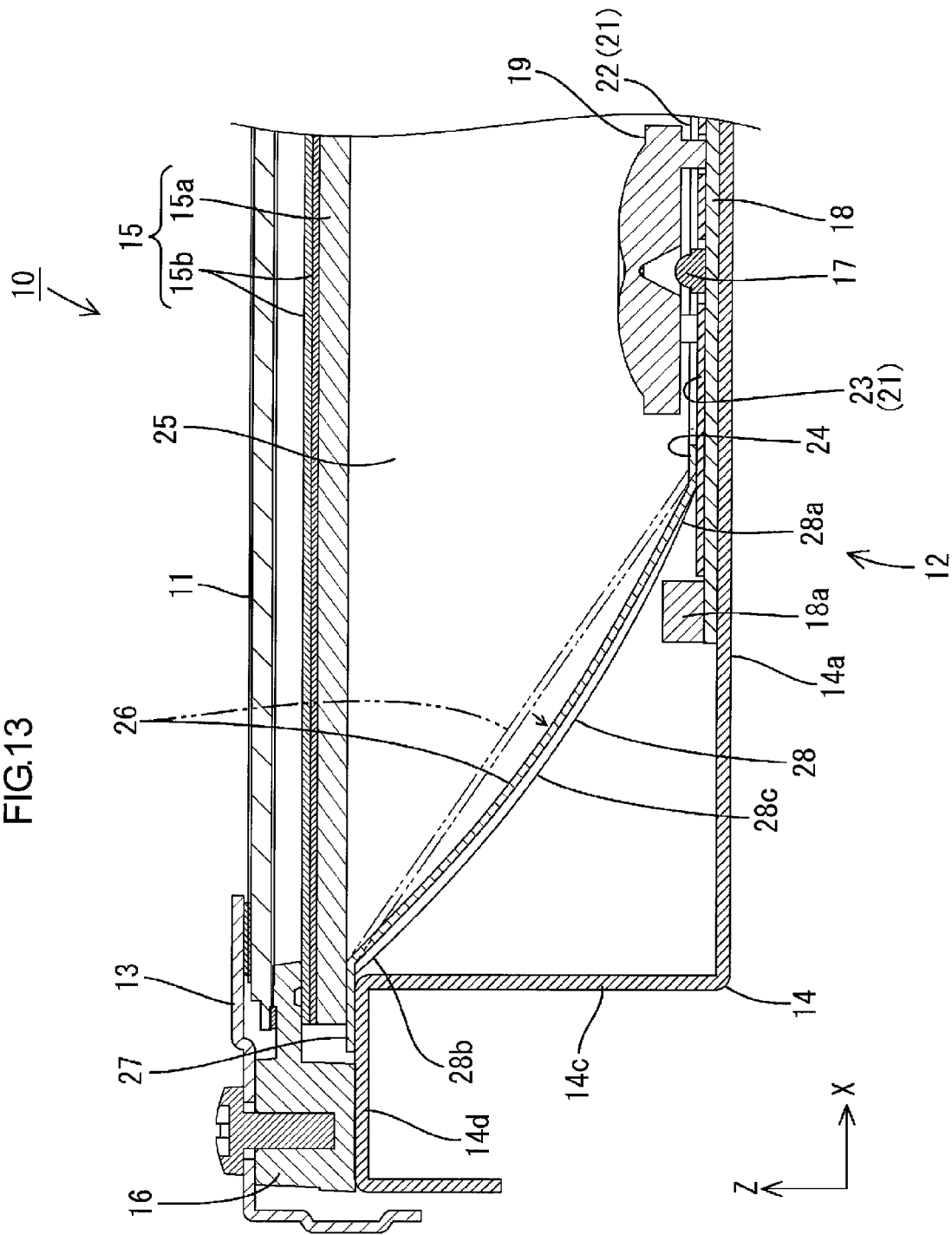
FIG. 13 is a cross sectional view taken along line xi-xi of FIG. 9, illustrating the second rising portion in a warping deformation state.

As illustrated in FIGS. 9 and 11, the overhang portions 28 are formed along the entire length of the side edges 25a of the first rising portions 25. In addition, the overhang portions 28 in their entire areas overlap with the side edges 26a of the second rising portions 26 along the entire length of the side edges 26a in plan view. Thus, when the second rising portions 26 are displaced outward in the X-axis direction due to warping deformation, the side edges 26a of the second rising portions 26 may be distanced from the side edges 25a of the first rising portions 25 but can be maintained in a contacted state with respect to the overhang portions 28 along the entire length of the side edges 26a (FIG. 12). Preferably, the overhang portions 28 may have an overhanging dimension beyond the side edges 25a of the first rising portions 25 such that the contacted state with the side edges 26a of the second rising portions 26 can be maintained even when the second rising portions 26 are subjected to a maximum assumed amount of warping deformation. The overhang portions 28 as a whole are bow-shaped in plan view and side view. The shape approximates (conforms to) the shape of the second rising portions 26 upon warping deformation. For example, when the second rising portion 26 is subjected to warping deformation, the central portion in the rising direction is greatly pulled outward (toward the side plate 14c) compared to the rising proximal side portion and the rising distal side portion, thus forming a bow-shape in side view (FIG. 13). Thus, by forming the overhang portions 28 in a shape conforming to the shape of the second rising portions 26 at the time of warping deformation, the overhang portions 28 can be reliably maintained in the contacted state with the side edges 26a of the second rising portions 26 without a gap along the entire length of the side edges 26a at the time of warping deformation. Accordingly, the development of a gap in the seams J between the first rising portions 25 and the second rising portions 26 can be prevented. Thus, the development of local dark areas near the seams J, namely uneven brightness, can be prevented.

The overhanging distal surfaces of the overhang portions 28 are arc-shaped in plan view and side view. Specifically, the overhanging dimension of the overhang portions 28 from the side edges 25a of the first rising portions 25 is larger in a central portion 28c than in a rising proximal side portion 28a and a rising distal side portion 28b. The overhanging dimension of the overhang portions 28 is gradually increased from the rising proximal side and the rising distal side toward the central side. As described above, the first reflection sheet 22 is formed from the expanded state illustrated in FIG. 14 by bending along the bending lines. In the expanded state, the interval between the first rising portions 25 and the second rising portions 26 is gradually increased from the rising proximal side toward the rising distal side. Thus, the overhanging dimension of the overhang portions 28, with regard to the portion from the rising proximal side to the center side, is proportional to the interval between the first rising portions 25 and the second rising portions 26. Thus, the overhang portions 28 can be formed without affecting the outer shape of the second rising portions 26. Further, in the expanded state, the interval between the first rising portions 25 and the second rising portions 26 is maximum at the rising distal end. Thus, a high degree of freedom is provided in setting the shape of the rising distal side portion 28b of the overhang portions 28. Thus, the rising distal side portion 28b of the overhang portions 28 has a bow shape overhanging outward beyond a straight line L (indicated by a two-dot chain line in FIG. 15) connecting the rising distal position and the central position of the overhang portions 28. As a result, the development of a gap from the side edges 26a of the second rising portions 26 is made more difficult to generate. The rising proximal side portion 28a and the rising distal side portion 28b of the overhang portions 28 may have substantially the same overhanging dimension such that the overhang portions 28 have a symmetric shape as a whole.

The operation of the structure according to the present embodiment will be described. First, a method of manufacturing the first reflection sheet 22 will be described. The first reflection sheet 22 of the expanded state illustrated in FIG. 14 can be obtained by punching a large base material for the first reflection sheet 22 by using a die conforming to the expanded shape of the first reflection sheet 22. At this time, preferably, perforations and the like may be formed along the bending lines of the first reflection sheet 22 in the expanded state. Then, the first reflection sheet 22 in the expanded state is bent along the bending lines at specific positions. Specifically, the first reflection sheet 22 in the expanded state is bent in a valley shape and a mountain shape at a rising proximal position and a rising distal position, respectively, of the rising portions 25 and 26, while the rising portions 25 and 26 are raised from the bottom portion 24 toward the front side. At this time, the side edges 25a of the first rising portions 25 and the side edges 26a of the second rising portions 26 are abutted against each other so as to form the seams J, and the side end surfaces of the side edges 26a of the second rising portions 26 are contacted to the inner surfaces of the overhang portions 28. In this state, the overhang portions 28 in their entire areas overlap with the second rising portions 26 in plan view while being disposed in the back side of the second rising portions 26.

The first reflection sheet 22 manufactured as described above is then housed in the backlight unit 12 to be used, which is assembled in a procedure described below. During the manufacture of the backlight unit 12, after the LED boards 18 having the LEDs 17 in pre-assembled form, the diffuser lenses 19, and the second reflection sheet 23 are housed in the chassis 14, the first reflection sheet 22 is placed in the chassis 14, and then the holding members 20 and the optical members 15 are assembled in order. When housing the first reflection sheet 22 in the chassis 14, the diffuser lenses 19 are inserted into the corresponding lens insertion holes 22a in the bottom portion 24 while the insertion holes 22b are communicated with the insertion holes 23c of the second reflection sheet 23, and the extension portions 27 are mounted on the receiving plates 14d (FIGS. 3 and 6). At this time, the rising portions 25 and 26, the side plates 14c and bottom plates 14a define the spaces S which are substantially triangular in side view. In the spaces S, the overhang portions 28 are located (FIG. 11). In this state, when the holding members 20 are attached to the chassis 14, the first reflection sheet 22, the second reflection sheet 23, and the LED boards 18 can be held with respect to the chassis 14 at once (FIGS. 7 and 8). Thereafter, the optical members 15 are mounted on the extension portions 27 in order of the diffuser plate 15a and the optical sheets 15b. In this way, the extension portions 27 are sandwiched between the receiving plates 14d and the optical members 15, whereby the position of the extension portions 27 is fixed (FIG. 11). The backlight unit 12 manufactured as described above is integrally assembled with the liquid crystal panel 11, which may be separately manufactured, by using the bezel 13, thus manufacturing the liquid crystal display device 10.

When the liquid crystal display device 10 manufactured as described above is used, the LEDs 17 of the backlight unit 12 are turned on and an image signal is supplied to the liquid crystal panel 11. Therefore, a predetermined image can be displayed on a display surface of the liquid crystal panel 11. Light emitted as the LEDs 17 are turned on initially becomes incident on the light incident surface 19a of the diffuser lenses 19, as illustrated in FIGS. 7 and 8. At this time, most of the light is incident on the inclined surface of the light incident surface 19a of the light incident side concave portion 19c, where the light is refracted at wide angles depending on the inclination angle as the light enters the diffuser lenses 19. The entered light is traveled through the diffuser lenses 19 and then output through the light output surface 19b. Because the light output surface 19b has a flat, substantially spherical shape, the light is further refracted in the interface with the outer air layer at wider angles as the light is output. In addition, the light output side concave portion 19e that is substantially bowl-shaped is formed in an area of the light output surface 19b where the amount of light from the LEDs 17 is maximum, with the peripheral surfaces of the area having a flat and substantially spherical shape. Thus, light can be output while being refracted at wide angles at the peripheral surfaces of the light output side concave portion 19e, or light can be reflected toward the LED boards 18. Some of the light that has been returned toward the LED boards 18 is reflected by the second reflection sheet 23 back toward the diffuser lenses 19 and becomes again incident on the diffuser lenses 19. Thus, the light can be effectively utilized. In addition, high brightness can be obtained.

Accordingly, the highly directional light emitted from the LEDs 17 can be diffused at wide angles by the diffuser lenses 19. Thus, the light that reaches the optical members 15 can be uniformly distributed in the plane of the optical members 15. In other words, by using the diffuser lenses 19, the areas between the adjacent LEDs 17 can be made difficult to be visually recognized as dark areas. Thus, the intervals between the LEDs 17 can be increased, which allows the number of the LEDs 17 that are installed to be decreased while preventing uneven brightness. By decreasing the number of the LEDs 17 to be installed, the intervals between the adjacent LEDs 17 can be increased, and the increased areas can be utilized for the installation of the holding members 20, and further the LED boards 18 can be fixed by using the holding members 20.

When the liquid crystal display device 10 is used as described above, the LEDs 17 of the backlight unit 12 are turned on or off. As a result, the internal temperature environment may be changed, possibly resulting in thermal expansion or thermal contraction of the constituent components of the liquid crystal display device 10. Among others, the first reflection sheet 22 constituting the backlight unit 12 is a large component made of a synthetic resin with a high thermal expansion rate. Thus, the first reflection sheet 22 may be subjected to a particularly large amount of expansion or contraction due to thermal expansion or thermal contraction. For example, when the temperature inside the backlight unit 12 is increased and thereby thermal expansion is occurred in the first reflection sheet 22, the bottom portion 24 is extended more in the long side direction (X-axis direction) than in the short side direction (Y-axis direction). As a result, the short sides of the bottom portion 24, i.e., the rising proximal position of the second rising portions 26, are displaced outward greatly in the X-axis direction. On the other hand, with regard to the rising distal position of the second rising portions 26, the continuous extension portions 27 are sandwiched between the receiving plates 14d and the diffuser plate 15a and are thereby substantially fixed. Thus, the rising portion proximal position tends to become closer to the rising distal position of the second rising portions 26, and the distance between the two is reduced, resulting in a large slack in the second rising portions 26. Consequently, the second rising portions 26 are warped and deformed into a bow shape and are displaced closer to the side plates 14c and the bottom plate 14a (i.e., outward in the X-axis direction), as illustrated in FIGS. 12 and 13. The amount of displacement due to such warping deformation is maximum at the central position of the second rising portions 26 and minimum at the rising proximal position and the rising distal position. In FIGS. 12 and 13, the state of the second rising portions 26 prior to warping deformation is indicated by two-dot chain lines while the direction of displacement due to warping deformation is indicated by an arrow.

When such warping deformation is occurred in the second rising portions 26 as described above, the side edges 26a are displaced away from the side edges 25a of the first rising portions 25, possibly resulting in a gap in the seams J. However, in accordance with the present embodiment, the overhang portions 28 formed at the side edges 25a of the first rising portions 25 overhang outward beyond the seams J, i.e., in the direction in which the second rising portions 26 is displaced at the time of outward warping deformation in the X-axis direction due to thermal expansion. Thus, even when the side edges 26a of the second rising portions 26 are displaced away from the side edges 25a of the first rising portions 25, the overhang portions 28 remain in the contacted state with respect to the side edges 26a of the second rising portions 26. Thus, the development of a gap in the seams J can be prevented. Further, the overhang portions 28 are formed along the entire length of the side edges 25a of the first rising portions 25 and are contacted with the entire length of the side edges 26a of the second rising portions 26. Thus, the development of gaps can be prevented along the entire length. Furthermore, the overhang portions 28 have a bow shape similar to the outer shape of the second rising portions 26 at the time of warping deformation. Thus, the contacted state of the second rising portions 26 with respect to the side edges 26a can be more reliably maintained. In this way, even when the first reflection sheet 22 is subjected to thermal expansion, the development of a gap in the seams J between the first rising portions 25 and the second rising portions 26 is prevented. Thus, light in the internal space enclosed by the first reflection sheet 22 in the backlight unit 12 can be prevented from leaking from around the seams J to the outside. Accordingly, the development of local dark areas at the four corners of the light output surface of the backlight unit 12 as a whole where the seams J are provided can be prevented, whereby even in-plane brightness can be obtained as a whole. Because even and uniform output light can be obtained from the backlight unit 12, good display quality can also be obtained on the display surface of the liquid crystal display device 10.

As described above, the backlight unit 12 according to the present embodiment includes: the LEDs 17 as the light source; the chassis 14 having the bottom plate 14a disposed on the side opposite to the light output side with respect to the LEDs 17 and housing the LEDs 17; and the first reflection sheet 22 including the square-shaped bottom portion 24 disposed along the bottom plate 14a and at least the two rising portions 25 and 26 rising from at least the two adjacent sides of the bottom portion 24 toward the light output side with the seams J formed between the adjacent side edges 25a and 26a, the first reflection sheet 22 reflecting light. On the side edges 25a of the first rising portions 25 of the at least two rising portions 25 and 26, the overhang portions 28 overhanging in a direction from the bottom portion 24 to the second rising portions 26 beyond the seams J are formed.

In this way, light from the LEDs 17 is reflected by the first reflection sheet 22 having the bottom portion 24 and the rising portions 25 and 26. Thus, the light can be efficiently output. The seams J are formed between the adjacent side edges 25a and 26a of the at least two rising portions 25 and 26, which rise from the at least two adjacent sides of the square-shaped bottom portion 24 of the first reflection sheet 22 toward the light output side. If a gap is formed at the seams J due to warping deformation of the second rising portions 26, light leaks through the gap, thereby generating local dark areas. This problem may be overcome by increasing the number of the LEDs 17 disposed near the seams J, for example. However, in this case, the number of the LEDs 17 to be installed increases, resulting in an increase in cost.

Thus, in accordance with the present embodiment, the overhang portions 28 are formed on the side edges 25a of the first rising portions 25 of the at least two rising portions 25 and 26, the overhang portions 28 overhanging in a direction from the bottom portion 24 to the second rising portions 26 beyond the seams J formed between the side edges 25a and the side edges 26a of the second rising portions 26. Thus, when the second rising portions 26 are displaced or pulled in a direction from the bottom portion 24 to the second rising portions 26 due to warping deformation, i.e., when the side edges 26a of the second rising portions 26 are displaced away from the side edges 25a of the first rising portions 25, the development of a gap between the side edges 25a and the side edges 26a of the second rising portions 26 can be prevented because of the overhang portions 28 formed on the side edges 25a of the first rising portions 25, the overhang portions 28 overhanging in a direction of displacement of the second rising portions 26 beyond the seams J. Accordingly, the leakage of light through the seams J can be prevented without increasing the number of the LEDs 17 to be installed. Thus, uneven brightness can be suppressed at low cost.

The bottom portion 24 has an elongated square shape, and the second rising portions 26 rise from the short sides of the bottom portion 24, whereas the first rising portions 25 having the overhang portions 28 rise from the long sides of the bottom portion 24. When thermal expansion is occurred in the bottom portion 24 having the elongated square shape due to a change in thermal environment, the amount of thermal expansion tends to be larger in the long side direction than in the short side direction. As a result, the rising proximal position of the second rising portions 26 rising from the short sides is displaced by the thermal expansion of the bottom portion 24 in the long side direction. Thus, warping deformation is easily occurred in the second rising portions 26. In this respect, according to the present embodiment, the overhang portions 28 are formed on the first rising portions 25 rising from the long sides. Thus, even when warping deformation is occurred in the second rising portions 26 on the short sides and the side edges 26a are displaced away from the side edges 25a of the first rising portions 25 on the long sides, the leakage of light can be effectively prevented by the overhang portions 28.

The second rising portions 26 rise from the pair of short sides of the bottom portion 24, whereas the first rising portions 25 rise from the pair of long sides of the bottom portion 24. The overhang portions 28 are formed each on the side edges 25a of the pair of first rising portions 25. In this way, even when the second rising portions 26 rising from the pair of short sides are subjected to warping deformation due to thermal expansion of the bottom portion 24, the development of a gap in the seams J at the four locations between the side edges 25a and 26a of the adjacent pairs of the second rising portions 26 and the first rising portions 25 can be avoided because of the overhang portions 28 formed on the side edges 25a of the first rising portions 25 rising from the long sides adjacent to the short sides. Accordingly, uneven brightness can be effectively suppressed.

With regard to the overhanging dimension from the side edges 25a of the first rising portions 25, the overhang portions 28 overhang more at the central portion 28c than at the rising proximal side portion 28a and the rising distal side portion 28b. At the time of warping deformation, the second rising portions 26 are displaced more at the central portion 28c than at the rising distal side portion 28b or the rising proximal side portion 28a. According to the present embodiment, the overhang portions 28 are configured as described above with regard to the overhanging dimension from the side edges 25a of the first rising portions 25. The overhang portions 28 have a shape similar to the shape of the second rising portions 26 at the time of warping deformation. Thus, the development of a gap in the seams J between the side edges 25a and the side edges 26a of the second rising portions 26 can be appropriately prevented. Thus, uneven brightness can be more reliably suppressed.

Further, the overhang portions 28 are configured such that their overhanging dimension from the side edges 25a of the first rising portions 25 increases from the proximal side and the rising distal side toward the central side. Thus, the shape of the overhang portions 28 conforms to the shape of the second rising portions 26 at the time of warping deformation. Thus, the development of a gap in the seams J with the side edges 26a of the second rising portions 26 is made more difficult to generate, thereby more reliably suppressing uneven brightness.

At least the rising distal side portion 28b of the overhang portions 28 may be bow-shaped. In the expanded state of the first reflection sheet 22 before the rising portions 25 and 26 are raised from the bottom portion 24, the interval between the second rising portions 26 and the first rising portions 25 is larger on the rising distal side than on the rising proximal side. Thus, the degree of freedom of setting the shape of the rising distal side portion 28b of the overhang portions 28 is relatively high compared to the rising proximal side portion 28a. Accordingly, the rising distal side portion 28b can be provided with a bow shape more similar to the shape of the second rising portions 26 at the time of warping deformation. Therefore, the development of a gap in the seams J with the side edges 26a of the second rising portions 26 is made more difficult to generate. Thus, uneven brightness can be more reliably suppressed.

At least the rising distal side portion 28b and the rising proximal side portion 28a of the overhang portions 28 may be bow-shaped. In this way, the overhang portions 28 have a shape more closely conforming to the shape of the second rising portions 26 at the time of warping deformation. Thus, the development of a gap in the seams J can be appropriately prevented and uneven brightness can be more appropriately prevented.

The overhang portions 28 may be bow-shaped along their entire length. In this way, the overhang portions 28 have a shape more closely approximating the shape of the second rising portions 26 at the time of warping deformation. Thus, the development of a gap in the seams J can be more appropriately prevented and uneven brightness can be more appropriately prevented.

The overhang portions 28 may have a symmetric shape such that the rising proximal side portion 28a and the rising distal side portion 28b have the same overhanging dimension from the side edges 25a of the first rising portions 25. In this way, the designing and dimension management of the first reflection sheet can be facilitated, thereby providing a manufacturing advantage.

The overhang portions 28 may overhang in the direction from the bottom portion 24 to the second rising portions 26 beyond the outer surfaces 26b of the second rising portions 26 on the side opposite to the light output side. In this way, the overhanging dimension of the overhang portions 28 can be set such that the overhang portions 28 can maintain their contacted state with respect to the side edges 26a of the second rising portions 26 even when the second rising portions 26 are subjected to a maximum warping deformation, for example. Thus, the development of a gap in the seams J formed between the adjacent rising portions 25 and 26 can be reliably prevented and uneven brightness can be reliably prevented.

The overhang portions 28 may be formed along the entire length of the side edges 25a of the first rising portions 25. In this way, the development of gaps between the overhang portions 28 and the side edges 26a of the second rising portions 26 can be prevented along the entire length. Thus, uneven brightness can be more appropriately suppressed.

The rising portions 25 and 26 may be inclined with respect to the bottom portion 24. In this way, light can be reflected by the rising portions 25 and 26 toward the light output side while being appropriately angled.

The chassis 14 include the side plates 14c rising from the bottom plate 14a and facing the rising portions 25 and 26 while maintaining the spaces S with the rising portions 25 and 26. In this way, even when the second rising portions 26 are displaced into the spaces S defined by the side plates 14c and the second rising portions 26 due to warping deformation, the development of a gap in the seams J can be prevented by the overhang portions 28. Thus, the leakage of light can be prevented. The overhang portions 28 overhanging from the side edges 25a and 26a of the first rising portions 25 may be provided into the spaces S between the side plates 14c and the second rising portions 26.

The light source may be the LEDs 17. In this way, high brightness can be obtained and power consumption can be decreased.

A plurality of the LEDs 17 are mounted on the LED boards 18 that are parallel to the bottom plate 14a and the bottom portion 24. When a plurality of the LEDs 17 are mounted on the LED boards 18, in order to mount more LEDs 17 near the seams J, for example, as according to conventional art, the LEDs 17 need to be unevenly distributed on the LED boards 18, which requires the manufacture of a special LED board and leads to increased cost. The need for such a conventional technology is eliminated by forming the overhang portions 28 on the side edges 25a of the first rising portions 25 of the first reflection sheet 22 as described above. Thus, a general-purpose LED board 18 in which the LEDs 17 are regularly arranged can be used, and a further cost reduction can be achieved.

On the light output side with respect to the LEDs 17, the diffuser lenses 19 outputting and diffusing the light from the LEDs 17 may be disposed. In this way, the light emitted from the LEDs 17 can be output and diffused by the diffuser lenses 19. Thus, unevenness in the output light can be made difficult to occur. Therefore, the number of the LEDs 17 to be installed can be decreased and thereby cost reduction can be achieved.

The first embodiment of the present invention has been described above. However, the present invention is not limited to the foregoing embodiment and may include modifications described below. In the following modifications, members similar to those of the foregoing embodiment will be designated with similar reference numerals or signs, and their illustration or description may be omitted.

<First Modification of the First Embodiment>

A first modification of the first embodiment will be described with reference to FIG. 16 or 17. In the first modification, overhang portions 28-1 have a modified shape.

Figure 16:
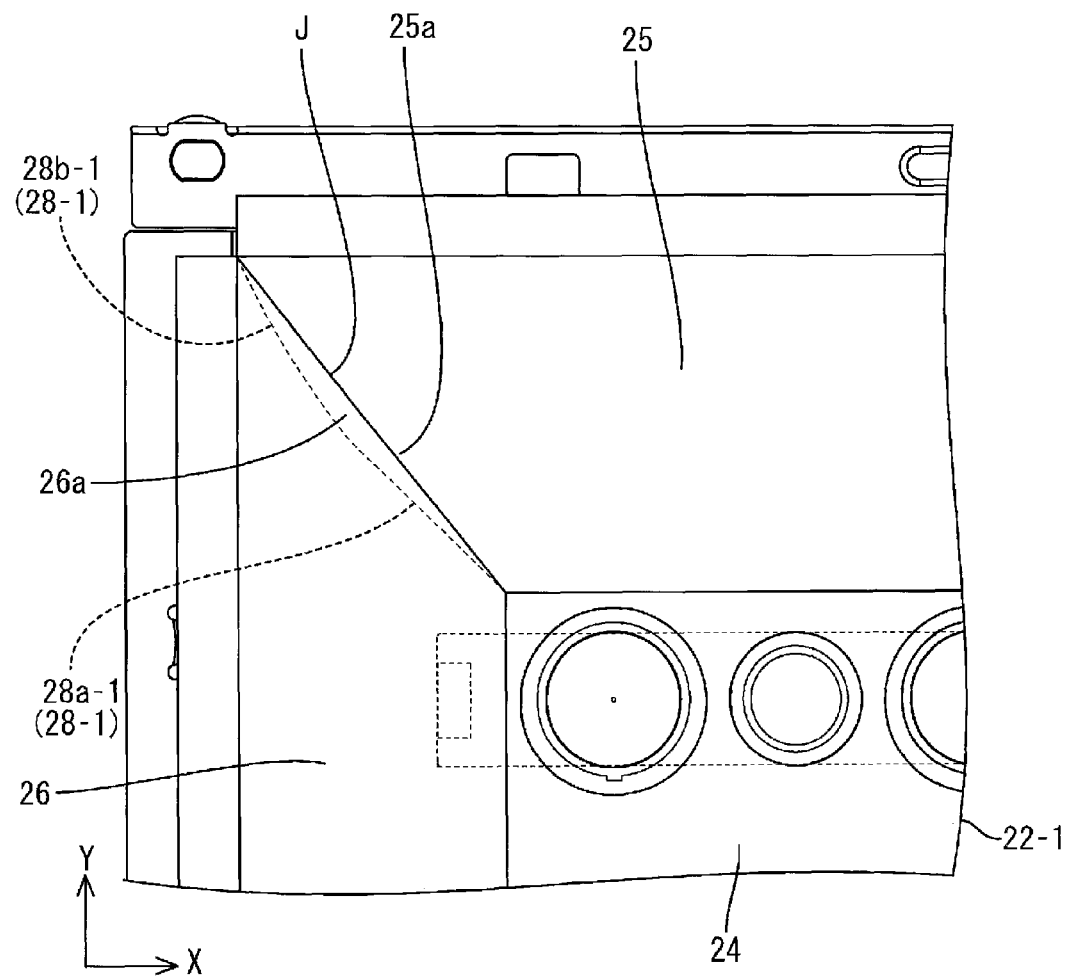
FIG. 16 is a plan view illustrating a detailed configuration of the overhang portion according to a first modification of the first embodiment.

As illustrated in FIG. 16, the overhang portions 28-1 include a rising distal side portion 28b-1 and a rising proximal side portion 28a-1 which are divided at the central position in the length direction of the overhang portions 28-1 as a boundary. The rising distal side portion 28b-1 is formed in a bow shape in plan view and side view, whereas the rising proximal side portion 28a-1 is triangular in plan view and side view. That is, the overhang portions 28-1 have an overhanging distal surface that is arc-shaped in plan view and side view in approximately one-half portion from the central position to the rising distal side, whereas approximately one-half portion from the central position to the rising proximal side forms a straight line inclined with respect to the X-axis direction and the Y-axis direction and having an acute angle with respect to the seams J. Of the overhang portions 28-1, the bow-shaped rising distal side portion 28b-1 has a large surface area compared to the triangular rising proximal side portion 28a-1 on account of the outward bulging of the overhanging distal surface.

Figure 17:
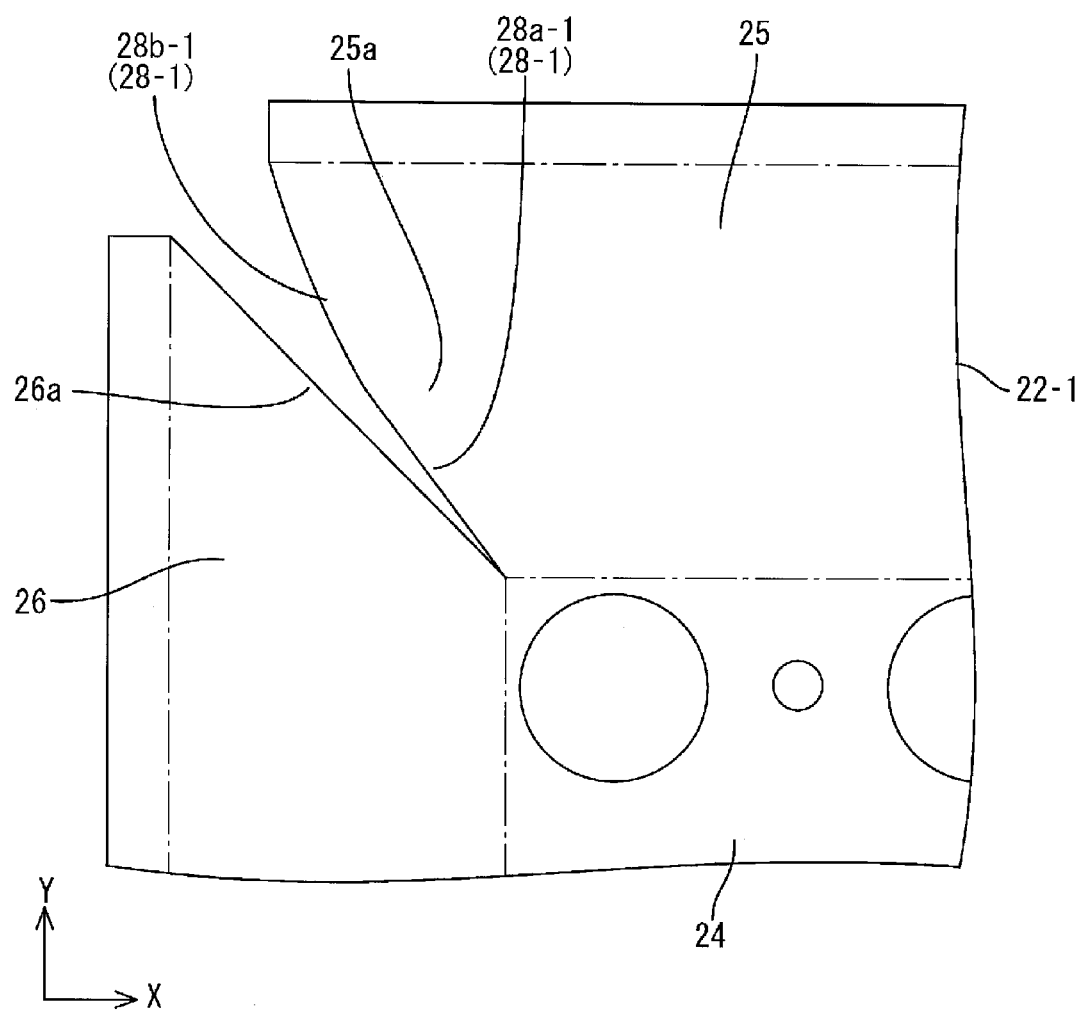
FIG. 17 is a plan view illustrating a detailed configuration of the overhang portion in the expanded state.

As illustrated in FIG. 17, when a first reflection sheet 22-1 is in the expanded state, the interval between the side edges 25a and 26a of the first rising portions 25 and the second rising portions 26 is gradually increased from the rising proximal side to the rising distal side, as described with reference to the first embodiment. For example, when the shape of the side edges 25a and 26a of the first rising portions 25 and the second rising portions 26 is changed so as to make the interval therebetween smaller, the spatial margin for forming the overhang portions 28-1 may decrease and thereby the designing of the shape of the overhang portions 28-1 may be greatly constrained. According to the present modification, the rising proximal side portion 28a-1 of the overhang portions 28-1 is triangular and the overhanging dimension from the side edges 25a of the first rising portions 25 is minimized. Thus, even when the interval between the first rising portions 25 and the second rising portions 26 is made smaller, the overhang portions 28-1 can be formed without affecting the outer shape of the adjacent second rising portions 26.

As described above, according to the present modification, the rising distal side portion 28b-1 of the overhang portions 28-1 is bow-shaped whereas the rising proximal side portion 28a-1 thereof is triangular. In this way, when the first reflection sheet 22-1 is in the expanded state prior to raising the rising portions 25 and 26 from the bottom portion 24, the interval between the second rising portions 26 and the first rising portions 25 is smaller on the rising proximal side than on the rising distal side. Thus, by making the rising proximal side portion 28a-1 of the overhang portions 28-1 triangular and thereby minimizing its overhanging dimension, the overhang portions 28-1 can be formed without affecting the outer shape of the adjacent second rising portions 26. Accordingly, the first reflection sheet 22-1 can be manufactured in a suitable manner.

<Second Modification of the First Embodiment>

A second modification of the first embodiment will be described with reference to FIG. 18 or 19. The present modification may be considered to be a further modification of the first modification such that overhang portions 28-2 have a shape further modified from the first modification.

Figure 18:
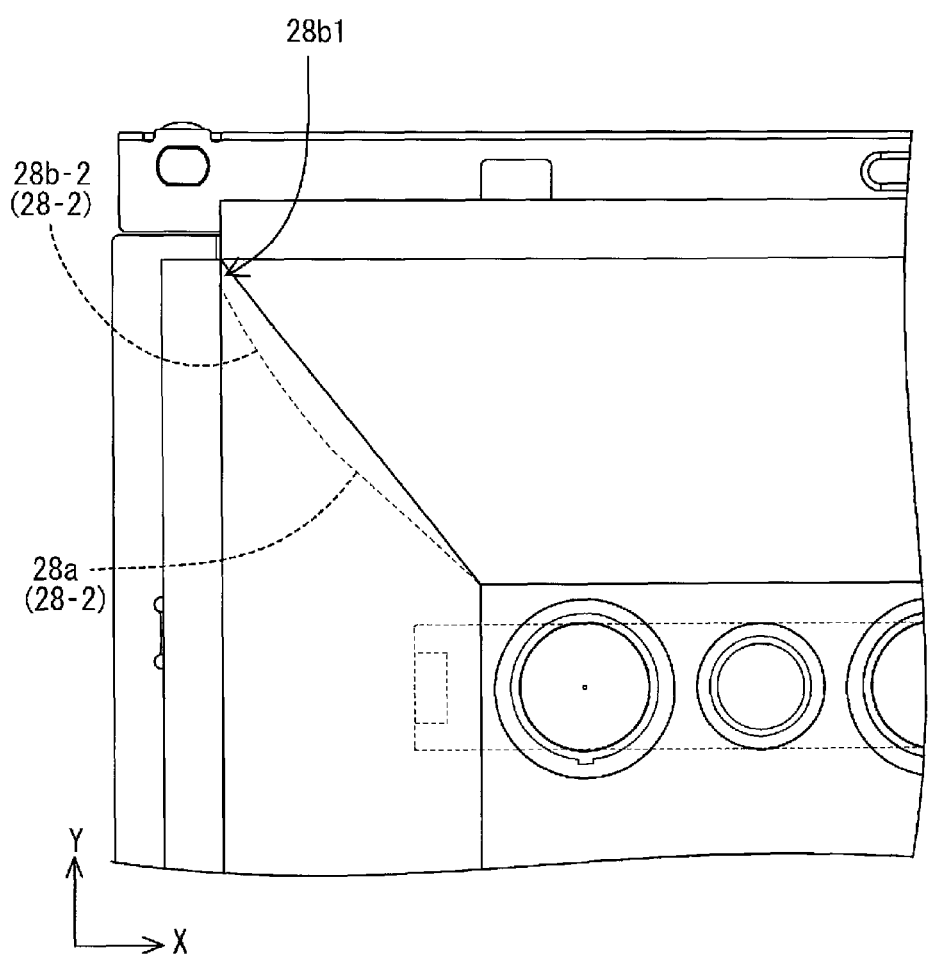
FIG. 18 is a plan view illustrating a detailed configuration of the overhang portion according to a second modification of the first embodiment.
Figure 19:
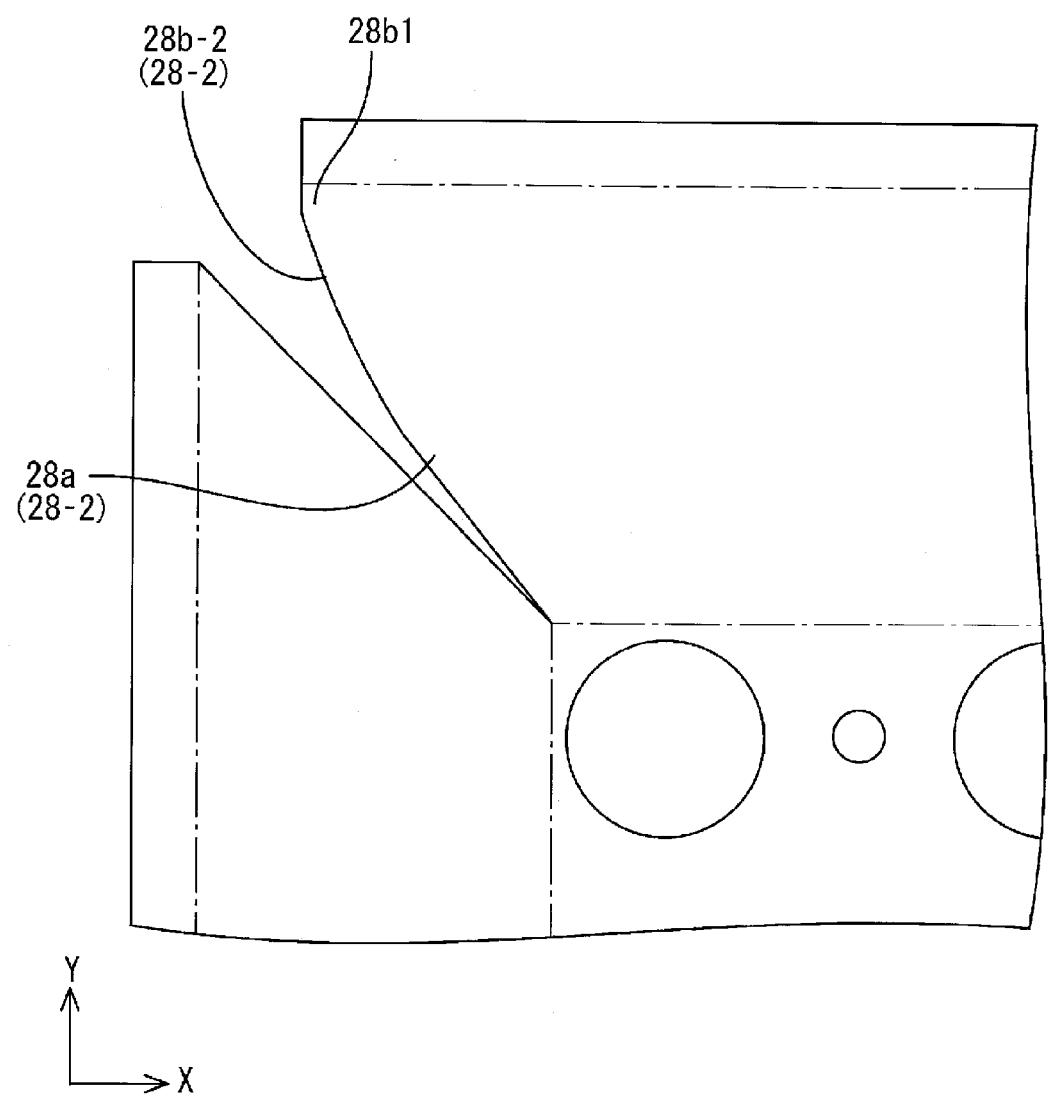
FIG. 19 is a plan view illustrating a detailed configuration of the overhang portion in the expanded state.

As illustrated in FIGS. 18 and 19, the overhang portions 28-2 include a rising distal side portion 28b-2 having a rising distal portion 28b1 that is partially triangular in plan view and side view. Specifically, a large portion of the distal side portion 28b-2 except for the rising distal portion 28b1 is bow-shaped and only the rising distal portion 28b1 is triangular as in the rising proximal side portion 28a. The rising distal portion 28b1 includes an overhanging distal surface that is substantially straight along the Y-axis direction. Thus, the rising distal side portion 28b-2 has a larger overhanging dimension of the rising distal portion 28b1 compared to the first modification, with the result that the surface area of the overhang portions 28-2 is relatively increased. The overhang portions 28-2 according to the present modification has an asymmetric shape.

<Third Modification of the First Embodiment>

A third modification of the first embodiment will be described with reference to FIG. 20 or 21. In the present modification, overhang portions 28-3 with a modified shape will be described.

Figure 20:
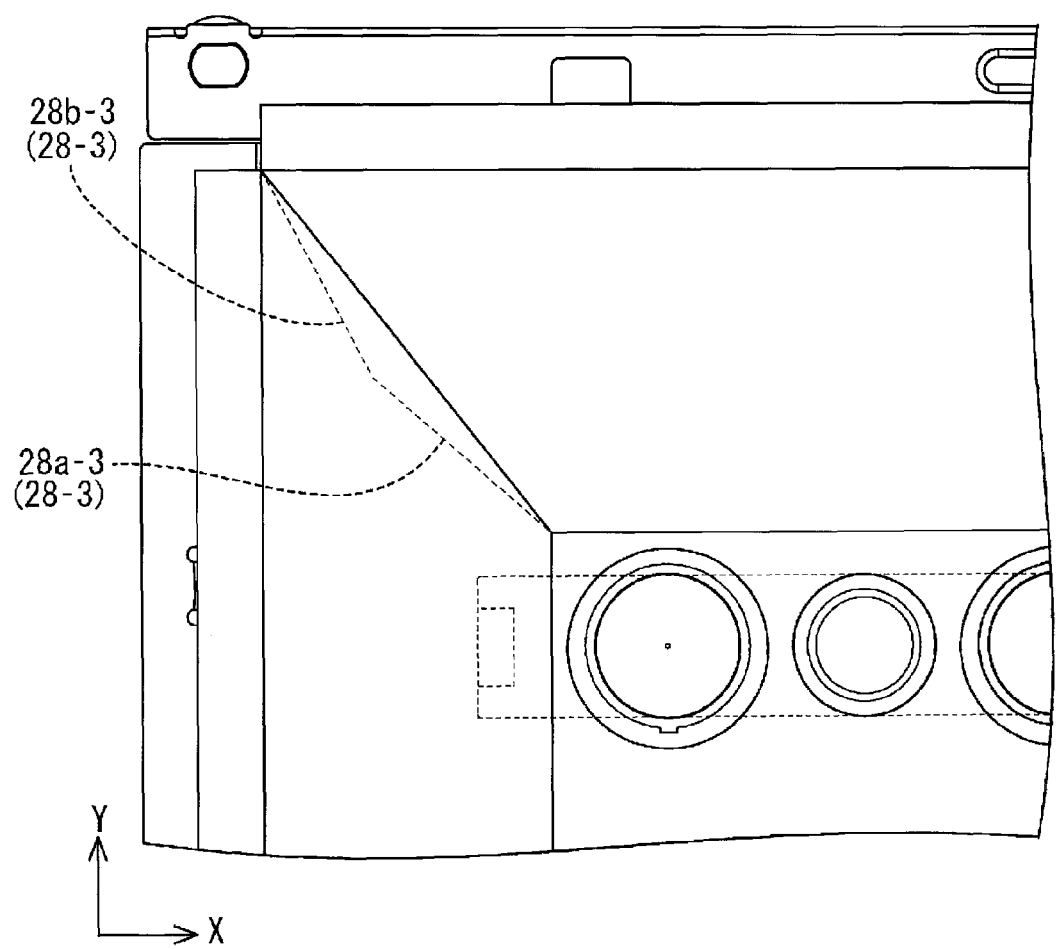
FIG. 20 is a plan view illustrating a detailed configuration of the overhang portion according to a third modification of the first embodiment.
Figure 21:
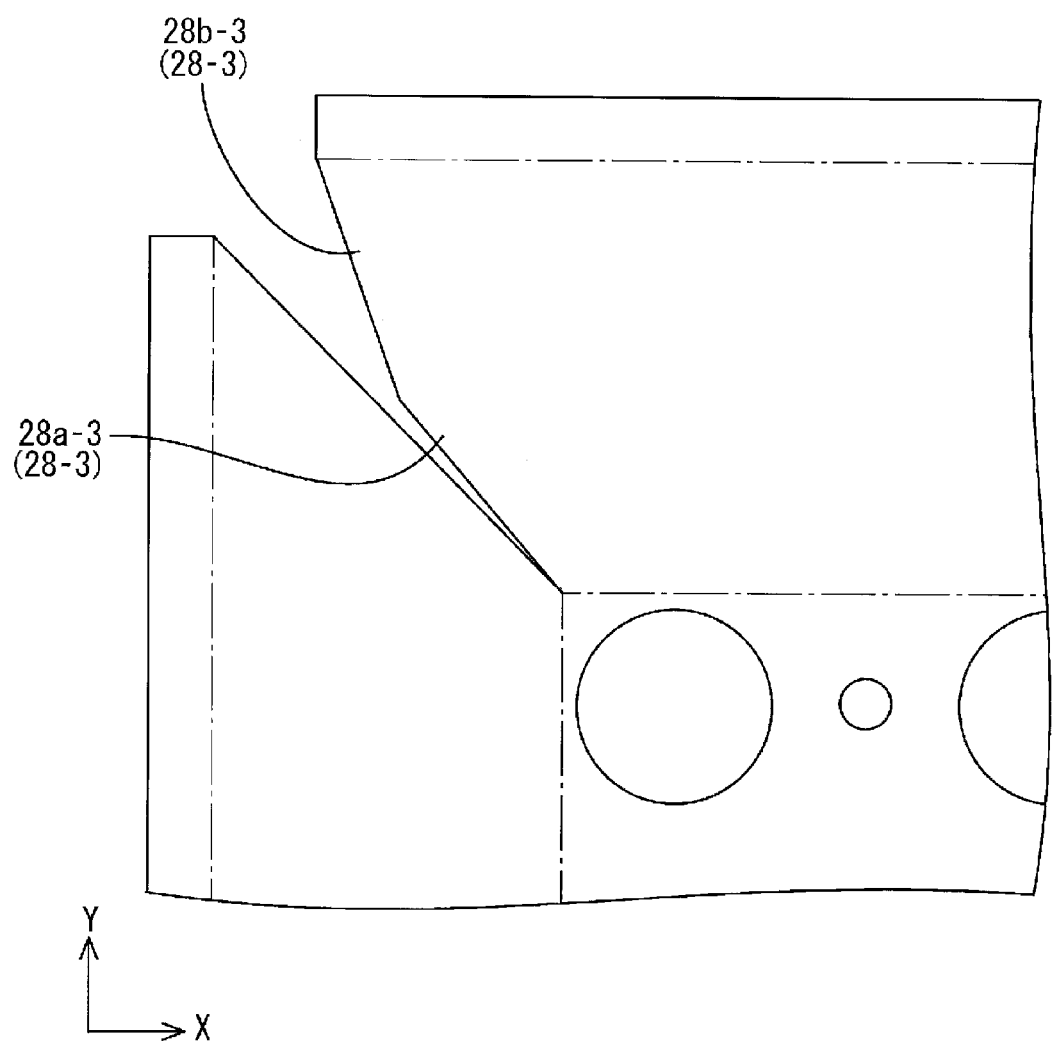
FIG. 21 is a plan view illustrating a detailed configuration of the overhang portion in the expanded state.

As illustrated in FIGS. 20 and 21, the overhang portions 28-3 are as a whole triangular in plan view and side view. Specifically, the overhang portions 28-3 include a rising distal side portion 28b-3 and a rising proximal side portion 28a-3. The overhang portions 28-3 are divided at a central position in the length direction thereof as a boundary. The rising distal side portion 28b-3 and the rising proximal side portion 28a-3 are both triangular. The rising distal side portion 28b-3 and the rising proximal side portion 28a-3 have symmetric shapes and the same surface areas. Thus, the overhang portions 28-3 may be described as having an isosceles triangle shape as a whole.

<Fourth Modification of the First Embodiment>

A fourth modification of the first embodiment will be described with reference to FIG. 22 or 23. In the present modification, overhang portions 28-4 with a modified shape will be described.

Figure 22:
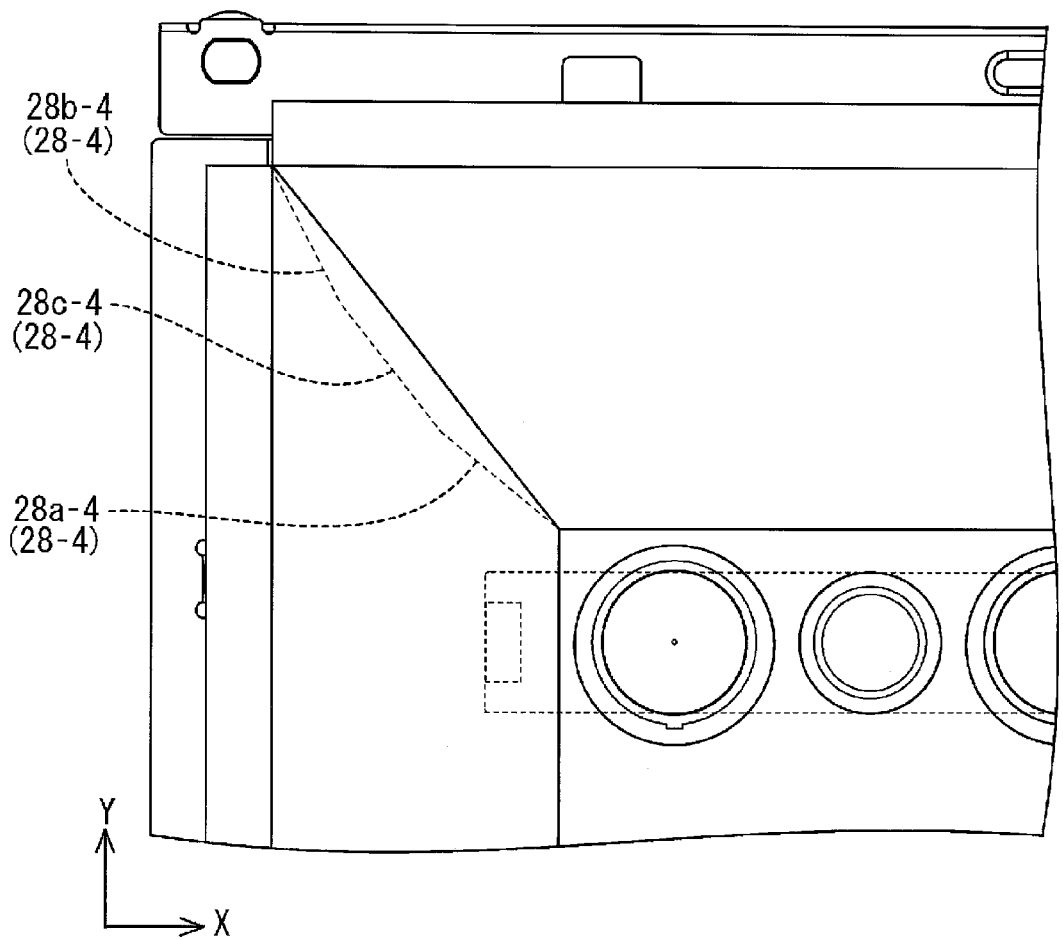
FIG. 22 is a plan view illustrating a detailed configuration of the overhang portion according to a fourth modification of the first embodiment.
Figure 23:
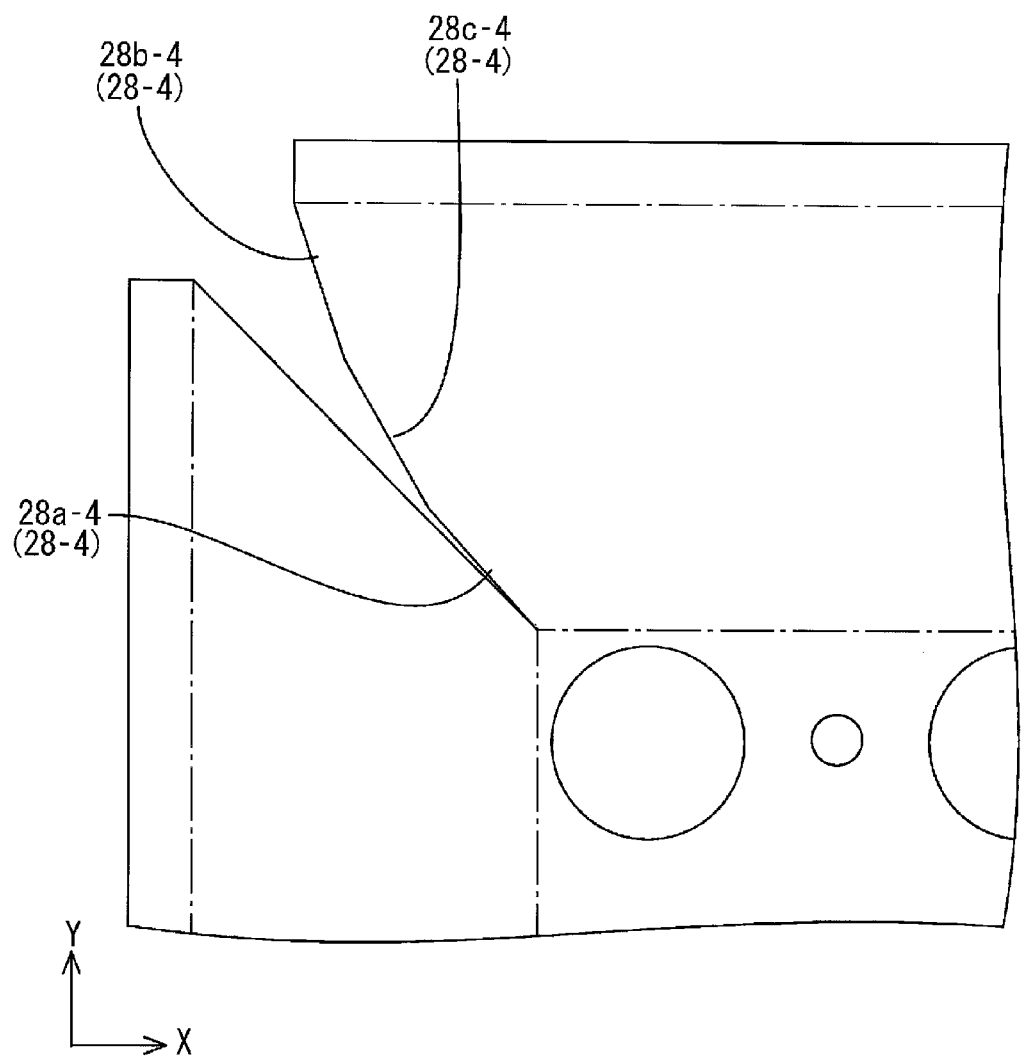
FIG. 23 is a plan view illustrating a detailed configuration of the overhang portion in the expanded state.

As illustrated in FIGS. 22 and 23, the overhang portions 28-4 have a trapezoidal shape as a whole in plan view and side view. Specifically, the overhang portions 28-4 include a rising proximal side portion 28a-4 and a rising distal side portion 28b-4 which are both triangular, and a central portion 28c-4 which is rectangular. The rising distal side portion 28b-4 and the rising proximal side portion 28a-4 have symmetric shapes and the same surface areas. Thus, the overhang portions 28-4 have an isosceles trapezoidal shape as a whole.

<Fifth Modification of the First Embodiment>

A fifth modification of the first embodiment will be described with reference to FIG. 24 or 25. The present modification may be described as being a further modification of the fourth modification in which overhang portions 28-5 have a shape further modified from the fourth modification.

Figure 24:
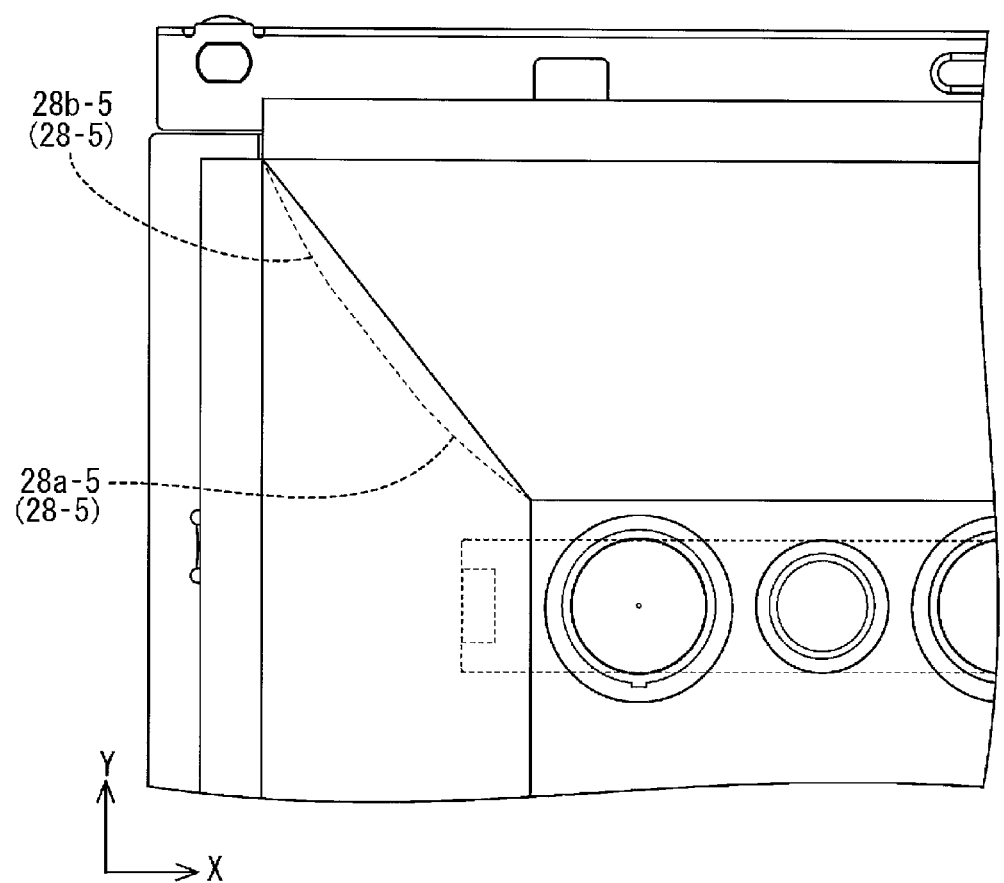
FIG. 24 is a plan view illustrating a detailed configuration of the overhang portion according to a fifth modification of the first embodiment.
Figure 25:
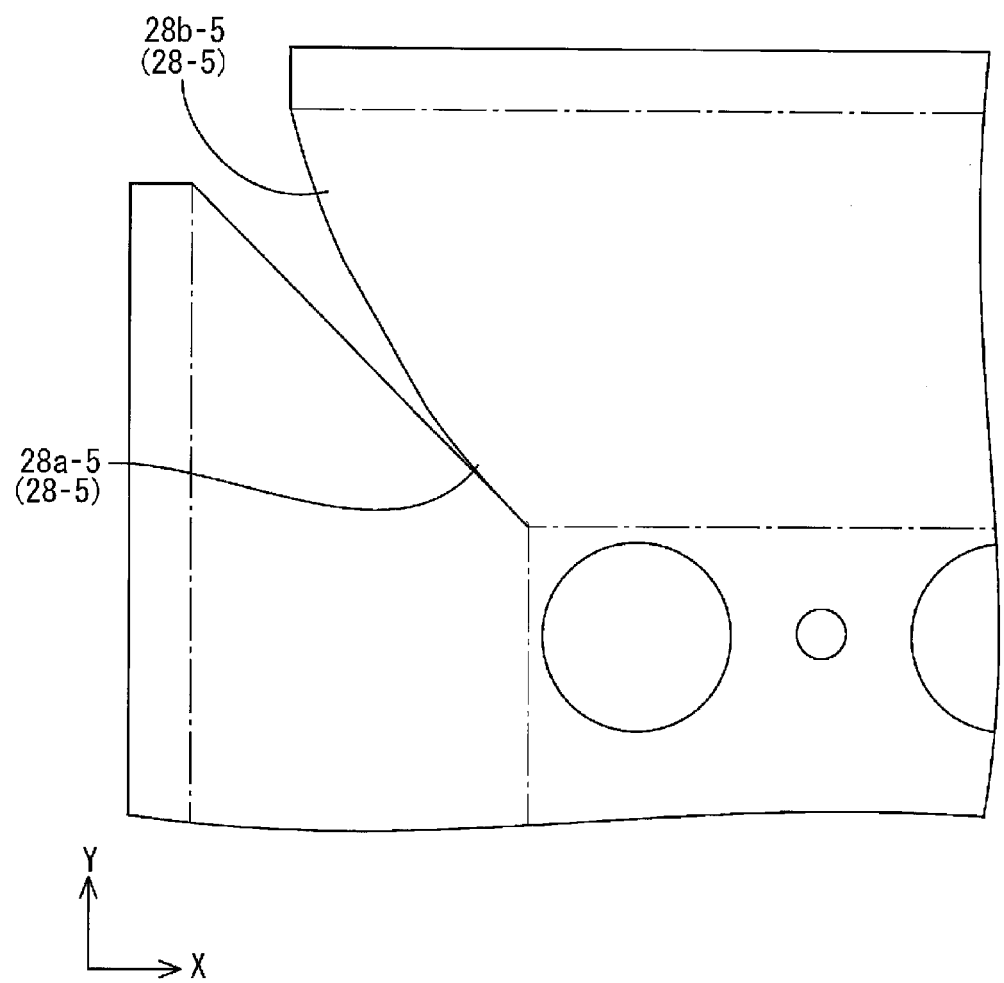
FIG. 25 is a plan view illustrating a detailed configuration of the overhang portion in the expanded state.

As illustrated in FIGS. 24 and 25, the overhang portions 28-5 include a rising distal side portion 28b-5 and a rising proximal side portion 28a-5 which are bow-shaped and have mutually symmetric shapes. That is, the rising distal side portion 28b-5 and the rising proximal side portion 28a-5 include overhanging distal surfaces that are arc-shaped.

<Sixth Modification of the First Embodiment>

A sixth modification of the first embodiment will be described with reference to FIGS. 26 to 28. In the present modification, overhang portions 28-6 are formed on the side of the second rising portions 26.

Figure 26:
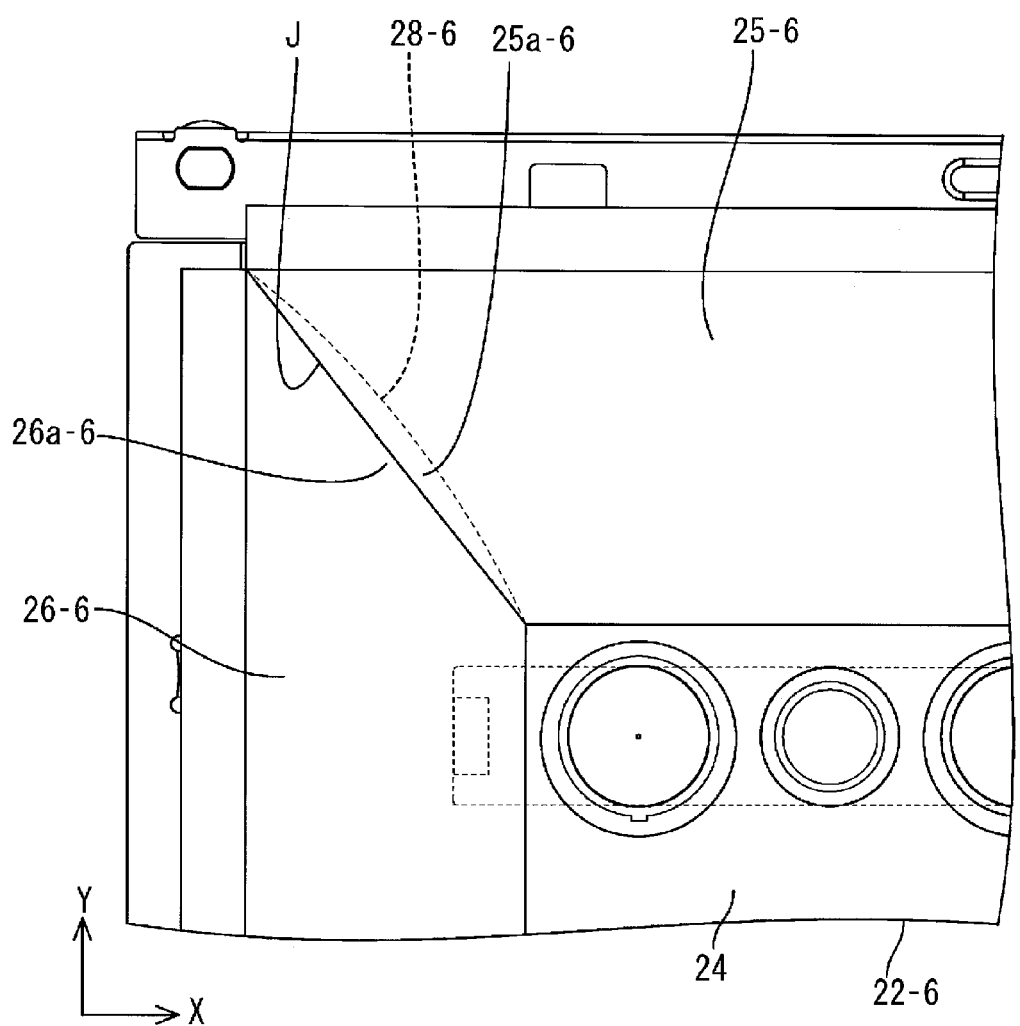
FIG. 26 is a plan view illustrating a detailed configuration of the overhang portion according to a sixth modification of the first embodiment.
Figure 27:
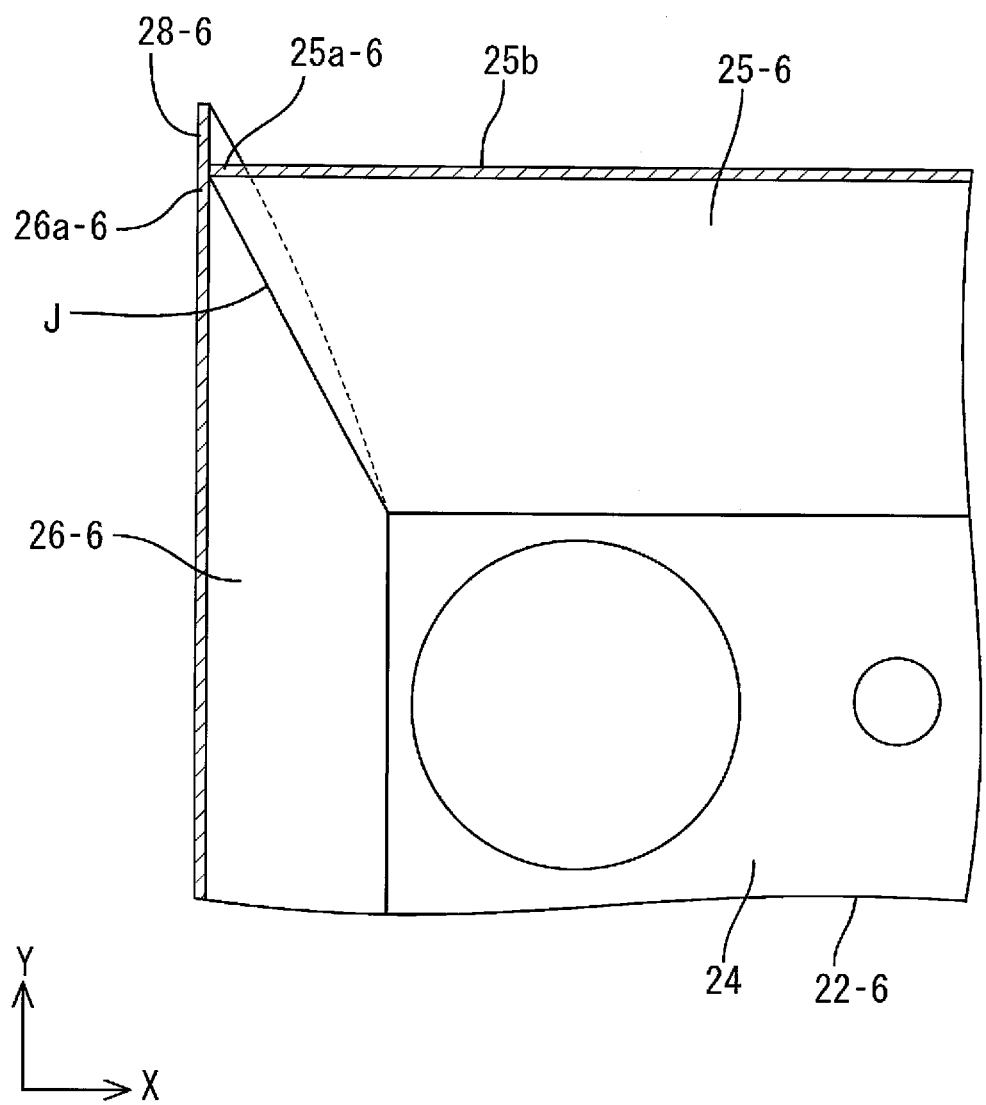
FIG. 27 is a planar cross sectional view illustrating a detailed relationship among the first rising portion, the second rising portion, and the overhang portion.
Figure 28:
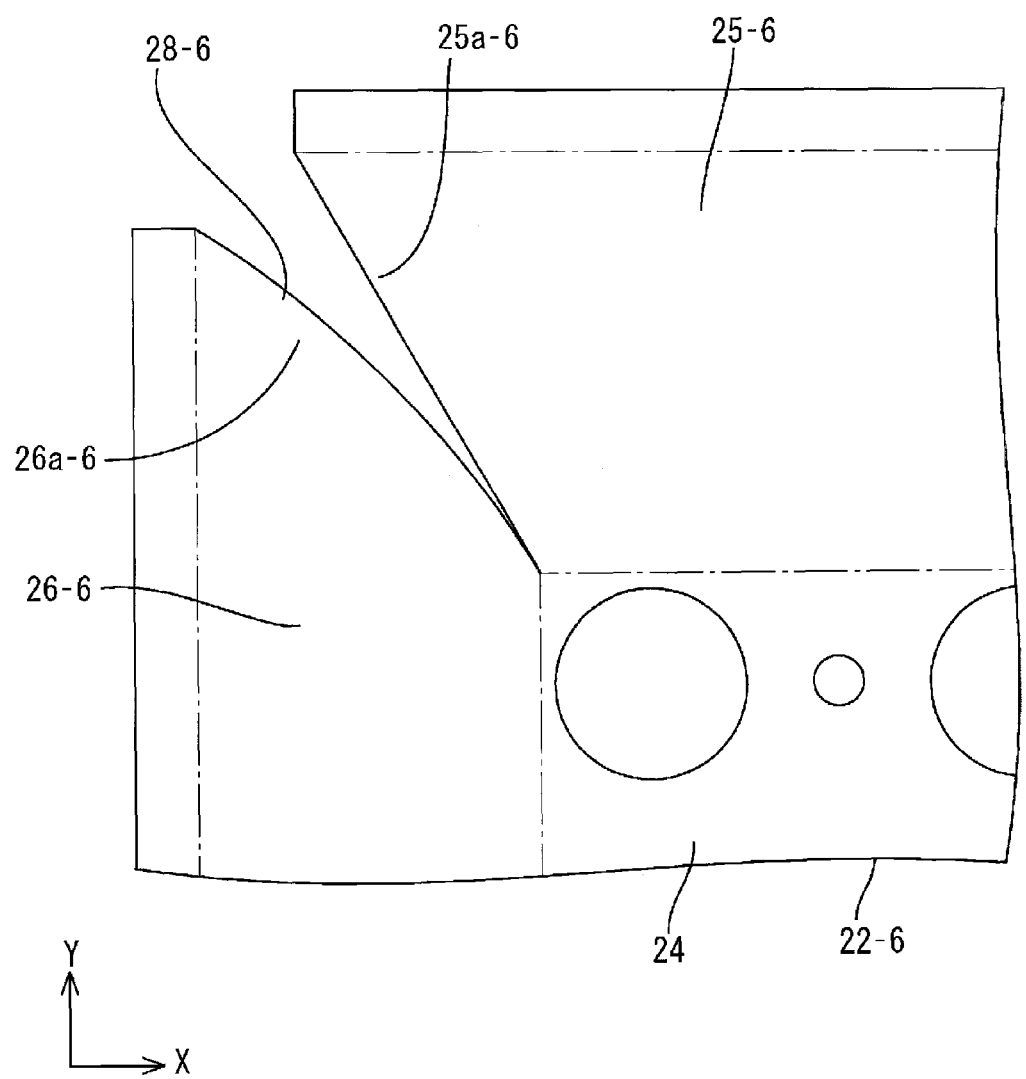
FIG. 28 is a plan view illustrating a detailed configuration of the overhang portion in the expanded state.

As illustrated in FIGS. 26 to 28, the overhang portions 28-6 are formed so as to overhang outward from side edges 26a-6 of second rising portions 26-6 beyond the seams J in the Y-axis direction; namely, in a direction from the bottom portion 24 to first rising portions 25-6. End surfaces of side edges 25a-6 of the first rising portions 25-6 are abutted against the inner surfaces of the overhang portions 28 (the surfaces facing the first rising portions 25-6), and the overhang portions 28-6 overhang outward beyond the outer surfaces 25b of the first rising portions 25-6 (the surfaces facing the side opposite to the light output side) in the Y-axis direction. The overhang portions 28-6 are formed in an area along the entire length of the side edges 26a-6 of the second rising portions 26-6. In addition, the overhang portions 28-6 in their entire areas overlap with the side edges 25a-6 of the first rising portions 25-6 along the entire length of the side edges 25a-6 in plan view. When the first reflection sheet 22-6 is subjected to thermal expansion with the result that the first rising portions 25-6 are deformed by warping and displaced outward in the Y-axis direction, the side edges 25a-6 of the first rising portions 25-6 may be spaced apart from the side edges 26a-6 of the second rising portions 26-6. However, the side edges 25a-6 can be maintained in a contacted state with respect to the overhang portions 28-6 along the entire length of the side edges 25a-6. Thus, the development of a gap in the seams J can be avoided. Accordingly, the present modification is suitable when warping deformation may be occurred in the first rising portions 25-6.

<Second Embodiment>

A second embodiment of the present invention will be described with reference to FIGS. 29 to 33. The second embodiment differs from the first embodiment in that the light source is changed to a hot cathode tube 30 and that a diffuser plate 115a has a modified configuration. Redundant description of structures, operation, or effects similar to those of the first embodiment will be omitted.

Figure 29:
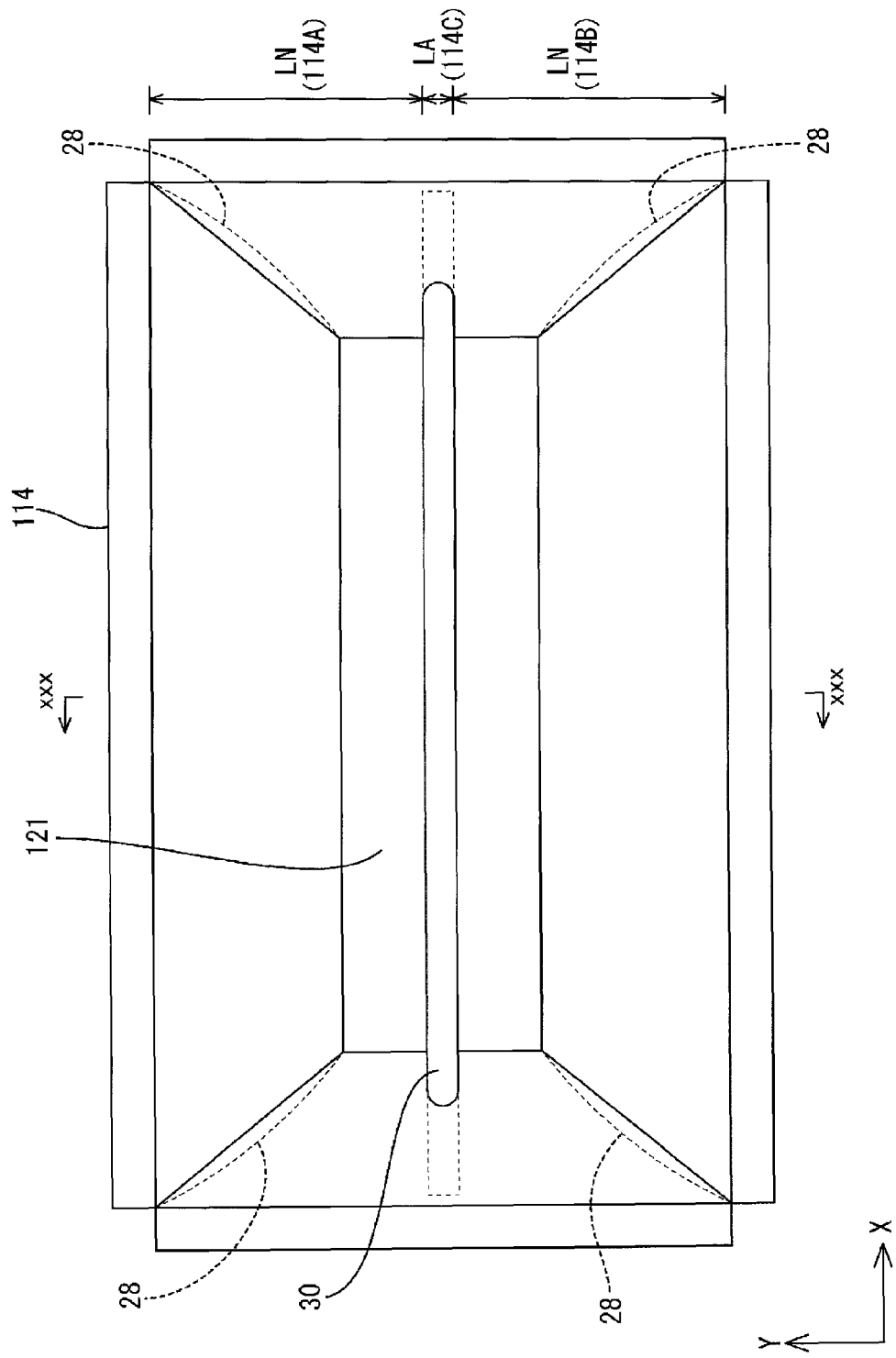
FIG. 29 is a plan view illustrating an arrangement of a hot cathode tube and the reflection sheet in the chassis according to a second embodiment of the present invention.
Figure 30:
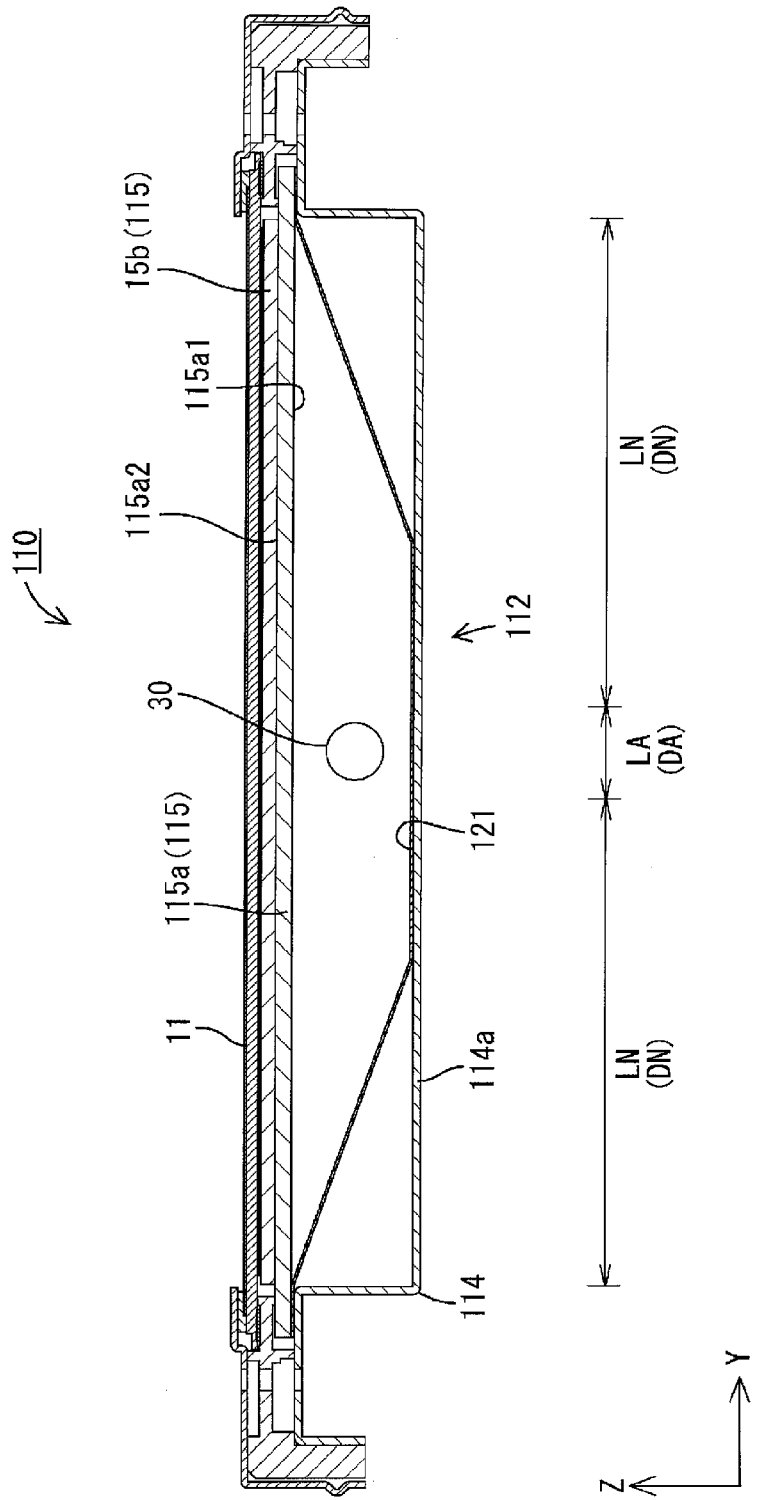
FIG. 30 is a cross sectional view taken along line xxx-xxx of FIG. 29.

As illustrated in FIGS. 29 and 30, a backlight unit 112 according to the present embodiment includes a single hot cathode tube 30 as the light source. The hot cathode tube 30 has a tubular shape (linear shape) as a whole and includes a hollow glass tube and a pair of electrodes disposed at the end portions of the glass tube. The glass tubes may enclose mercury and a rare gas, and the internal wall surfaces of the glass tubes may be coated with a fluorescent material. The hot cathode tube 30 has a light emitting surface corresponding to an outer peripheral surface of the glass tube. Thus, the hot cathode tube 30 can emit light radially from its axial center. To the end portions of the hot cathode tube 30, sockets which are not illustrated are externally fitted, and the electrodes are connected via the sockets to a power supply board attached to an outer surface (back surface side) of the bottom plate 114a of the chassis 114 for supplying electric power.

One hot cathode tube 30 with the above configuration is housed in the chassis 114 with a length direction (axial direction) thereof aligned with the long side direction of the chassis 114. The hot cathode tube 30 is positioned at substantially the center of the chassis 114 in the short side direction thereof. Specifically, a portion facing the diffuser plate 115a in the chassis 114 includes a first end portion 114A, a second end portion 114B positioned in an end portion opposite to the first end portion 114A, and a central portion 114C sandwiched between the first and the second end portions 114A and 114B in the short side direction (Y-axis direction) thereof. The hot cathode tube 30 is disposed in the central portion 114C, forming a light source disposed area LA therein. The hot cathode tube 30 is not disposed in the first end portion 114A or the second end portion 114B of the chassis 114, where light source non-disposed areas LN are formed. Thus, the hot cathode tube 30 is exclusively disposed at the central portion 114C of the bottom plate 114a of the chassis 114 in the short side direction, where the light source disposed area LA is formed. The light source disposed area LA has an area (length dimension in the Y-axis direction) smaller than the area of each of the light source non-disposed areas LN (length dimension in the Y-axis direction). The ratio of the area of the light source disposed area LA (length dimension in the Y-axis direction) to the area of the entire screen (vertical dimension (short side dimension) of the screen) may be about 4%. The pair of the light source non-disposed areas LN has substantially the same area. In the present embodiment, the second reflection sheet 23 according to the first embodiment is omitted, and only the first reflection sheet 22 according to the first embodiment is used as the reflection sheet 121. The reflection sheet 121 has a configuration similar to the first reflection sheet 22 according to the first embodiment and also includes the overhang portions 28 (FIG. 29)

Next, a configuration of the diffuser plate 115a will be described. As illustrated in FIG. 30, the diffuser plate 115a includes a base substrate in which diffusing particles are dispersed so as to provide substantially uniform light transmittance and light reflectance throughout the base substrate. Preferably, the base substrate of the diffuser plate 115a may have light transmittance of about 70% and light reflectance of about 30%. The diffuser plate 115a includes a surface on the back side facing the hot cathode tube 30 (to be hereafter referred to as "a first surface 115a1") and a surface located on the side opposite to the first surface 115a1 and facing the liquid crystal panel 11 (to be hereafter referred to as "a second surface 115a2"). The first surface 115a1 is configured to be a light-incident surface on which the light from the hot cathode tube 30 is incident. The second surface 115a2 is configured to be a light output surface through which the light (illumination light) is output toward the liquid crystal panel 11.

Figure 31:
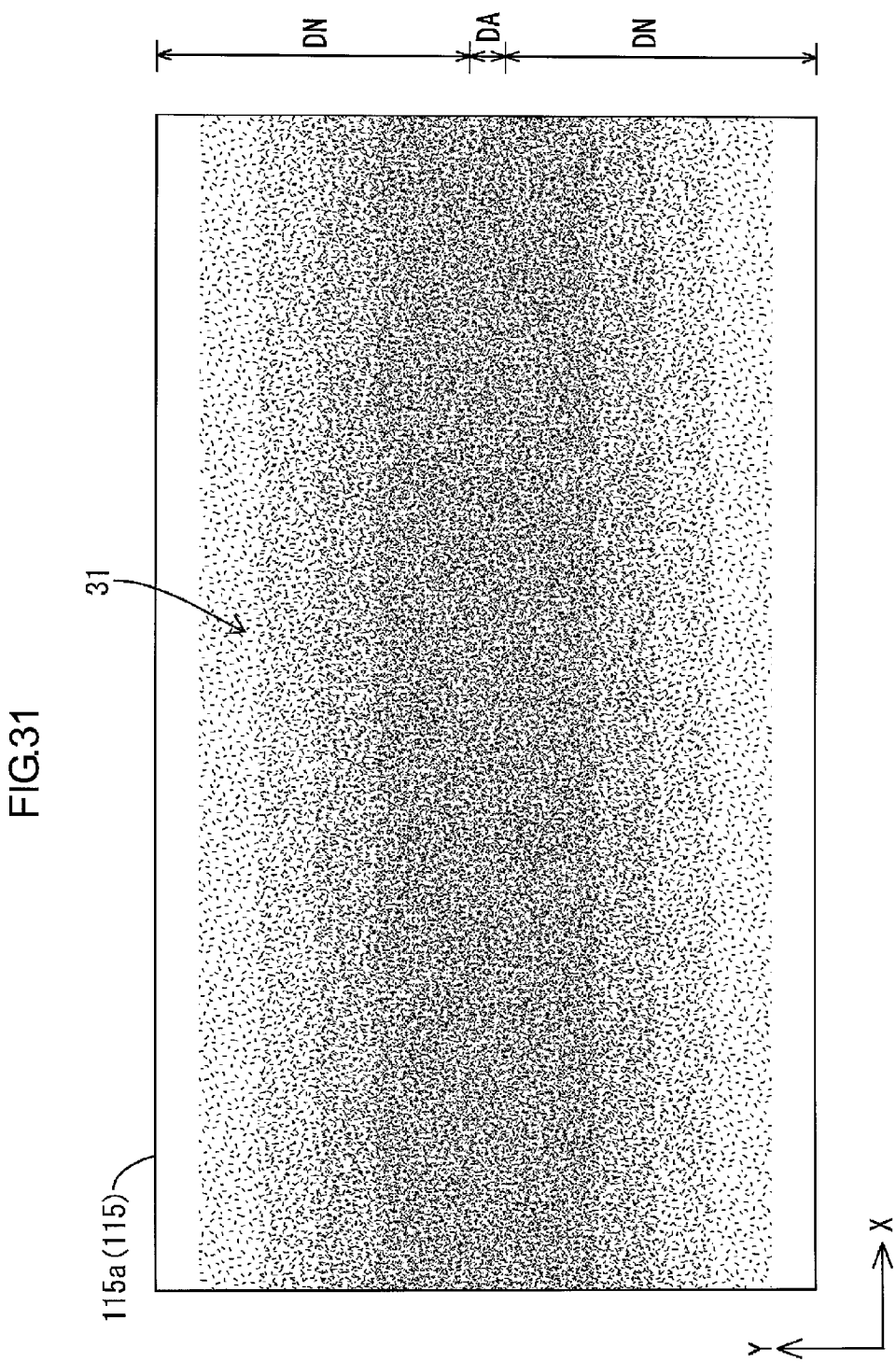
FIG. 31 a plane view illustrating distribution of light reflectance in a diffuser plate.
Figure 32:
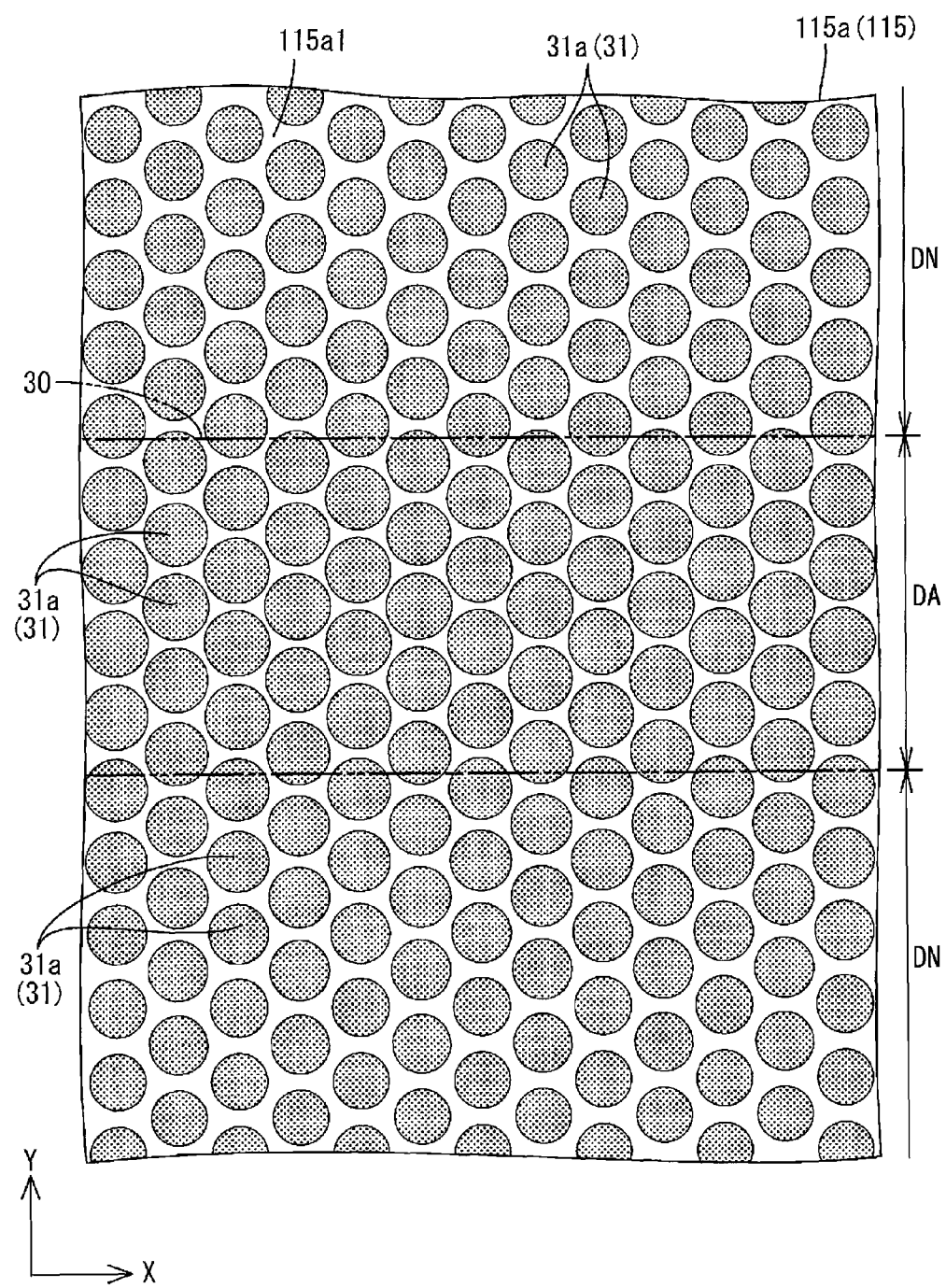
FIG. 32 is a partially enlarged plane view illustrating a schematic configuration of a surface of the diffuser plate facing the hot cathode tube.

As illustrated in FIGS. 31 and 32, on the first surface 115a1 of the diffuser plate 115a constituting the light-incident surface, a light reflection portion 31 having a white dot pattern is formed. Specifically, the light reflection portion 31 is formed by a plurality of dots 31a having a circular shape in plan view and arranged in a zig-zag (staggered or alternately displaced) manner. The dot pattern constituting the light reflection portion 31 may be formed by printing a paste containing a metal oxide, for example, on the surface of the diffuser plate 115a by screen printing, inkjet printing or the like. The light reflection portion 31 itself may have light reflectance of about 75%, which is larger than the light reflectance in the plane of the diffuser plate 115a, which is of about 30%. In accordance with the present embodiment, the light reflectance of the various materials are based on the average light reflectance measured in a measurement diameter by using CM-3700d from Konica Minolta, Inc., with LAV (measurement diameter φ 25.4 mm). The light reflectance of the light reflection portion 31 itself is a value obtained by measuring a surface of the light reflection portion 31 formed on an entire surface of a glass substrate, by using the above measuring means.

Figure 33:
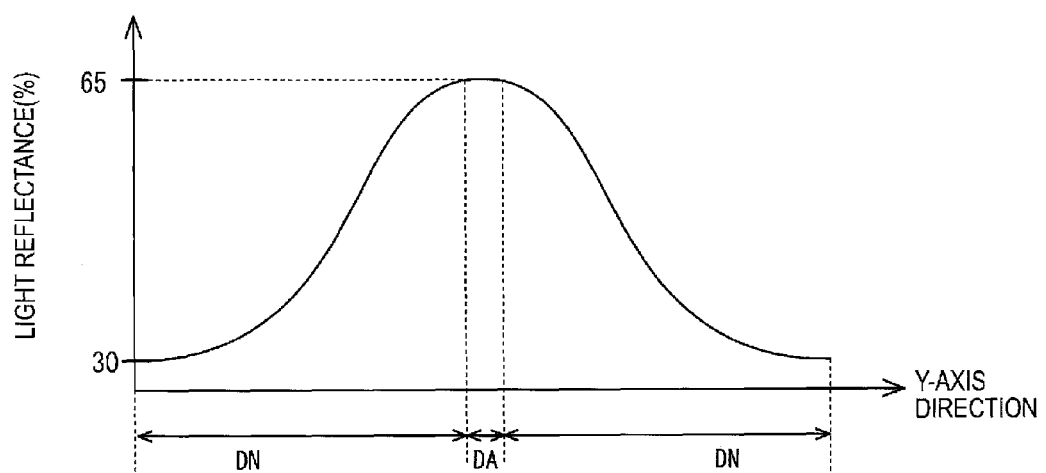
FIG. 33 is a graph plotting changes in light reflectance in a short side direction of the diffuser plate.

The diffuser plate 115a has a long side direction (X-axis direction) and a short side direction (Y-axis direction). The dot pattern of the light reflection portion 31 is varied such that the light reflectance on the first surface 115a1 of the diffuser plate 115a facing the hot cathode tube 30 is changed along the short side direction, as illustrated in FIG. 33 (see also FIG. 31). That is, in the diffuser plate 115a illustrated in FIG. 31, the first surface 115a1 as a whole includes a portion overlapping with the hot cathode tube 30 (to be hereafter referred to as "a light source overlapping portion DA") whose light reflectance is larger than the light reflectance of a portion not overlapping with the hot cathode tube 30 (to be hereafter referred to as "light source non-overlapping portions DN"). The light reflectance on the first surface 115a1 of the diffuser plate 115a is hardly changed and remains substantially uniform along the long side direction (see FIG. 31).

Distribution of light reflectance on the diffuser plate 115a will be described in detail. As illustrated in FIGS. 31 to 33, the light reflectance on the diffuser plate 115a is continuously decreased in a direction away from the hot cathode tube 30 and continuously increased in a direction toward the hot cathode tube 30 along the short side direction (Y-axis direction), where the distribution of the light reflectance is set to be the normal distribution (bell-shaped curve). Specifically, the light reflectance on the diffuser plate 115a is maximum at a central position (position aligned with the center of the hot cathode tube 30) in the short side direction and minimum at both end positions in the short side direction. The maximum value of the light reflectance is about 65%, for example, and the minimum value of the same is about 30%, for example, which is equal to the light reflectance of the diffuser plate 115a. Thus, only a little or hardly any of the light reflection portion 31 are disposed at the end positions of the diffuser plate 115a in the short side direction.

In order to achieve the above distribution of light reflectance, the light reflection portion 31 has the following configuration. The area of each of the dots 31a constituting the light reflection portion 31 is maximum at the central position of the diffuser plate 115a in the short side direction. That is, the dots at positions aligned with the center of the hot cathode tube 30 in the short side direction have the maximum area. The area of the dots 31a is gradually decreased in a direction away from the center position. The dots 31a at the end-most portions of the diffuser plate 115a in the short side direction have the minimum area. Thus, the area of the dots 31a is set to be smaller as their distance from the center of the hot cathode tube 30 increases. This configuration allows the diffuser plate 115a as a whole to provide a gradual illumination brightness distribution. Therefore, the backlight unit 112 as a whole can provide a gradual illumination brightness distribution. Preferably, the light reflectance may be adjusted by changing the intervals between the dots 31a of the light reflection portion 31 while the area of the dots 31a is kept uniform.

As described above, the hot cathode tube 30 is disposed exclusively in the central portion 114C of the chassis 114, and the diffuser plate 115a includes the light reflection portion 31, whereby the following operation can be provided. Namely, when the hot cathode tube 17 is turned on, the emitted light is incident on the first surface 115a1 of the diffuser plate 115 where, as illustrated in FIG. 31, the light reflection portion 31 having different light reflectance in various areas in the plane thereof is formed. Thus, the light incidence efficiency can be appropriately controlled on an area by area basis. Specifically, in the light source overlapping portion DA of the first surface 115a1 overlapping with the hot cathode tube 30, the amount of direct light from the hot cathode tube 30 is large, resulting in a relatively large amount of light compared to the light source non-overlapping portions DN. Thus, by making the light reflectance (area of the dots 31a) of the light reflection portion 31 in the light source overlapping portion DA relatively large (see FIGS. 31 and 33), incidence of light on the first surface 115a1 can be suppressed (regulated), while allowing much light to be reflected back into the chassis 114. On the other hand, in the light source non-overlapping portions DN of the first surface 115a1 not overlapping with the hot cathode tube 30, the amount of direct light from the hot cathode tube 30 is small, resulting in a relatively small amount of light compared to the light source overlapping portion DA. Thus, by making the light reflectance (area of the dots 31a) of the light reflection portion 31 in the light source non-overlapping portions DN relatively small (see FIGS. 31 and 33), incidence of light on the first surface 115a1 can be facilitated. At this time, the amount of light in the light source non-overlapping portions DN is compensated as the light reflected by the light reflection portion 31 in the light source overlapping portion DA back into the chassis 114 is guided by the reflection sheet 121. Thus, a sufficient amount of light incident in the light source non-overlapping portions DN can be ensured. The light output from the hot cathode tube 30 is provided with the above-described optical function by the process of passing through the diffuser plate 115a, whereby the light is converted in the plane of the diffuser plate 115a into substantially uniform planar light having no unevenness. The light is further provided with optical functions through the optical sheets 15b and then irradiated onto the liquid crystal panel 11.

As described above, according to the present embodiment, the lighting device may further include the diffuser plate 115a as the optical member 115 disposed on the light output side with respect to the hot cathode tube 30 as the light source. The chassis 114, in the portion facing the diffuser plate 115a, includes the light source disposed area LA in which the hot cathode tube 30 is disposed, and the light source non-disposed areas LN in which the hot cathode tube 30 is not disposed. The diffuser plate 115a includes a portion overlapping with the light source disposed area LA (light source overlapping portion DA), and a portion overlapping with the light source non-disposed areas LN (light source non-overlapping portions DN). The light reflectance of at least the first surface 115a1 of the light source overlapping portion DA facing the hot cathode tube 30 is higher than the light reflectance of at least the first surface 115a1 of the light source non-overlapping portions DN facing the hot cathode tube 30. In this way, light emitted from the hot cathode tube 30 initially reaches the portion of the diffuser plate 115a having the relatively large light reflectance (light source overlapping portion DA). Therefore, most of the light is reflected (i.e., not transmitted). Thus, the brightness of illumination light is suppressed compared to the amount of output light from the hot cathode tube 30. On the other hand, since the light reflected here is reflected by the reflection sheet 121 in the chassis 114, the light can reach the light source non-disposed areas LN. In the portion of the diffuser plate 115a overlapping with the light source non-disposed areas LN (light source non-overlapping portions DN), the light reflectance is relatively small such that more light is transmitted, thereby allowing a predetermined brightness of illumination light to be obtained.

The chassis 114, in the portion facing the diffuser plate 115a, includes at least the first end portion 114A, the second end portion 114B on the end portion opposite to the first end portion 114A, and the central portion 114C sandwiched between the first end portion 114A and the second end portion 114B. Of these, the central portion 114C corresponds to the light source disposed area LA, and the first end portion 114A and the second end portion 114B correspond to the light source non-disposed areas LN. In this way, sufficient brightness can be ensured in the central portion of the backlight unit 112. Therefore, brightness can also be ensured in a display central portion of the liquid crystal display device 110 having the backlight unit 112, thus providing high visibility.

Further, the light source may be the hot cathode tube 30. In this way, high brightness can be obtained.

<Third Embodiment>

A third embodiment of the present invention will be described with reference to FIG. 34. In the third embodiment, the light source of the second embodiment is changed to cold cathode tubes 40. Redundant description of structures, operation, or effects similar to those of the first embodiment will be omitted.

In accordance with the present embodiment, the cold cathode tubes 40 as the light source have a long tubular (linear) shape, as illustrated in FIG. 34. Specifically, the cold cathode tubes 40 include a hollow and long glass tube whose end portions are sealed, and a pair of electrodes enclosed in the glass tube at the ends. The glass tubes may contain mercury, a rare gas and the like, and the inner wall surfaces thereof are coated with a fluorescent material. At the end portions of the cold cathode tubes 40, relay connectors (not illustrated) are disposed and connected to lead terminals protruding from the electrodes to the outside of the glass tubes. The cold cathode tubes 40 are connected via the relay connectors to an inverter board (not illustrated) mounted on the outer surface side of the bottom plate 214a of the chassis 214 for controlling the operation of the cold cathode tubes 40. The cold cathode tubes 40 may have an outer diameter of about 4 mm, which is smaller than the outer diameter of the hot cathode tube 30 (such as about 15.5 mm) according to the second embodiment.

Six cold cathode tubes 40 having the above configuration are arranged parallel to each other at predetermined intervals (arrangement pitch) in an eccentrically-located manner in the chassis 124, with their length direction (axial direction) aligned with the long side direction of the chassis 214. More specifically, the bottom plate 214a (facing the diffuser plate 30) of the chassis 214 includes equally divided portions of a first end portion 214A, a second end portion 214B on the end portion opposite to the first end portion 214A, and a central portion 214C sandwiched between the first end portion 214A and the second end portion 214B in the short side direction. The cold cathode tubes 40 are disposed in the central portion 214C of the bottom plate 214a, where the light source disposed area LA is formed. The light source disposed area LA according to the present embodiment is larger than the light source disposed area LA according to the second embodiment. On the other hand, in the first end portion 214A and the second end portion 214B of the bottom plate 214a, the cold cathode tubes 40 are not disposed and the light source non-disposed areas LN are formed. The reflection sheet 221 has a configuration similar to the second embodiment and includes the overhang portions 28.

Thus, in accordance with the present embodiment, the light source may be the cold cathode tubes 40. In this way, longer operating life can be obtained and lighting control can be easily obtained.

<Other Embodiments>

The present invention is not limited to any of the foregoing embodiments with reference to the drawings. The technical scope of the present invention may include the following embodiments.

(1) Other than the first embodiment and its modifications, the concrete shape or overhanging dimension of the overhang portion may be modified as needed. However, the present invention also includes the shape of the overhang portion such as a parallelogram or a rhombus in plan view.

(2) In the foregoing embodiments, the overhang portion has an overhanging dimension that gradually increases from the rising proximal side and the rising distal side toward the central side. However, the present invention also includes the overhanging dimension of the overhang portion gradually increasing from the rising proximal side to the rising distal side such that the overhanging dimension is maximum at the rising distal position. Alternatively, the present invention also includes the overhang portion having a constant overhanging dimension along the entire length of the overhang portion.

(3) In the foregoing embodiments, the overhanging dimension of the overhang portion increases from the rising proximal side and the rising distal side to the central side continuously gradually. However, the present invention also includes the overhanging dimension of the overhang portion increasing from the rising proximal side and the rising distal side to the central side successively in a step-wise manner.

(4) In the foregoing embodiments, the overhang portion is formed along the entire length of the side edge of the first rising portion (or the second rising portion). However, the present invention also includes the overhang portion provided in a partial area of the side edge of the first rising portion (or the second rising portion).

(5) In the foregoing embodiments, a pair of the overhang portions is formed on both of the side edges of the first rising portion (or the second rising portion). However, the overhang portion may be formed on only one of the side edges of the first rising portion (or the second rising portion). In addition, the overhang portions may be formed on both of a pair of the first rising portions (both of a pair of the second rising portions). Alternatively, the overhang portions may be formed only on one of the pair of the first rising portions (or one of the pair of the second rising portions) and no overhang portion may be formed on the other first rising portion (or the other second rising portion).

(6) In the foregoing embodiments, the rising portions are inclined with respect to the bottom portion. However, the present invention also includes the rising portions rising substantially vertically from the bottom portion.

(7) In the foregoing embodiments, the bottom portion of the first reflection sheet (reflection sheet) has a horizontally long rectangular shape. However, the present invention also includes the bottom portion having a square shape.

(8) In the first embodiment, the LEDs as the light source are uniformly distributed over substantially the entire area of the bottom plate of the chassis (the bottom portion of the first reflection sheet). However, the present invention also includes the LEDs exclusively disposed in the central portion of the bottom plate of the chassis, as in the second or the third embodiment. In this case, by using the diffuser plate having the light reflection portion described in the second or the third embodiment, uniform output light without uneven brightness can be obtained from the backlight unit.

(9) In the first embodiment, the light source is an LED, which is a type of a point light source. However, the present invention also includes other types of point light source. Alternatively, the present invention also includes a planar light source such as an organic EL light source.

(10) In the second embodiment, the light source is a single hot cathode tube. However, the present invention also includes two or more hot cathode tubes. Similarly, in the third embodiment, six cold cathode tubes are used as the light source. However, the present invention also includes more or less than six cold cathode tubes.

(11) In the second and third embodiments, the light source is a hot cathode tube or a cold cathode tube as a type of fluorescent tube (linear light source). However, the present invention also includes other types of fluorescent tube. Alternatively, the present invention also includes a discharge tube other than the fluorescent tube (such as mercury lamps) as a light source.

(12) In the foregoing embodiments, one type of light source is used. However, the present invention also includes a plurality of types of light source used in combination. Specifically, a hot cathode tube and a cold cathode tube may be used in combination; a hot cathode tube and an LED may be used in combination; a cold cathode tube and an LED may be used in combination; or a hot cathode tube, a cold cathode tube, and an LED may be used in combination.

(13) In the second and third embodiments, the central portion of the chassis corresponds to the light source disposed area while the first end portion and the second end portion of the chassis correspond to the light source non-disposed areas. However, the present invention also includes the configuration where at least one of the first end portion and the second end portion of the chassis may correspond to the light source disposed area while the other portions may correspond to the light source non-disposed area. In this case, the first end portion and the central portion may correspond to the light source disposed area, or the second end portion and the central portion may correspond to the light source disposed area. When the location of the light source is changed as described above, the dot pattern of the light reflection portion of the diffuser plate may be modified accordingly.

(14) In the foregoing embodiments, the liquid crystal panel and the chassis are vertically disposed with their short side direction aligned with the vertical direction by way of example. However, the present invention also includes the liquid crystal panel and the chassis vertically disposed with their long side direction aligned with the vertical direction.

(15) In the foregoing embodiments, TFTs are used as the switching components of the liquid crystal display device. However, switching components other than TFTs (such as thin-film diodes (TFD)) may be used in the liquid crystal display device. The liquid crystal display device may be configured for black-and-white display as well as color display.

(16) In the foregoing embodiments, the liquid crystal display device includes a liquid crystal panel as a display panel by way of example. However, the present invention may be applied to display devices using other types of display panel.

(17) In the foregoing embodiments, the television receiver includes a tuner byway of example. However, the present invention may be applied to display devices not including a tuner.

EXPLANATION OF SYMBOLS

10, 110: Liquid crystal display device (Display device)
11: Liquid crystal panel (Display panel)
12, 112: Backlight unit (Lighting device)
14, 114: Chassis
14a, 114, 214: Bottom plate
14c: Side plate
15, 115: Optical member
15a, 115a: Diffuser plate (Optical member)
17: LED (Light source)
18: LED board
19: Diffuser lens
21: Reflection sheet (Reflection member)
22: First reflection sheet (Reflection member)
24: Bottom portion
25: First rising portion (One rising portion)
25a: Side edge
26: Second rising portion (Other rising portion)
26a: Side edge
28: Overhang portion
28a: Rising proximal side portion
28b: Rising distal side portion
28c: Central side portion
30: Hot cathode tube (Light source)
31: Light reflection portion
40: Cold cathode tube (Light source)
114A, 214A: First end portion
114B, 214B: Second end portion
114C, 214C: Central portion
115a1: First surface (Surface facing the light source)
121, 221: Reflection sheet
DA: Light source overlapping portion (Portion overlapping with light source disposed area)
DN: Light source non-overlapping portion (Portion overlapping with light source non-disposed area)
J: Seam
LA: Light source disposed area
LN: Light source non-disposed area
S: Space
TV: Television receiver

The invention claimed is:

1. A lighting device comprising:
a light source;
a chassis including a bottom plate disposed on a side opposite to a light output side with respect to the light source and housing the light source; and
a reflection member configured to reflect light and including a square-shaped bottom portion disposed along the bottom plate, and at least two rising portions rising from at least two adjacent sides of the bottom portion toward the light output side, with a seam formed between adjacent side edges of the at least two rising portions, wherein:
one of the at least two rising portions include an overhang portion on the side edges thereof; and
the overhang portion overhangs beyond the seam in a direction from the bottom portion to the other rising portion.

2. The lighting device according to claim 1, wherein:
the bottom portion has an elongated square shape;
the other rising portion rises from a short side of the bottom portion; and
the one rising portion having the overhang portion rises from a long side of the bottom portion.

3. The lighting device according to claim 2, wherein:
the other rising portion rises from each of a pair of short sides of the bottom portion;
the one rising portion rises from each of a pair of long sides of the bottom portion; and
the overhang portion is formed on both of the side edges of a pair of the one rising portions.

4. The lighting device according to claim 1, wherein the overhanging dimension of the overhang portion from the side edge of the one rising portion is larger in a central portion between a rising proximal side portion and a rising distal side portion than in the rising proximal side portion and the rising distal side portion.

5. The lighting device according to claim 4, wherein the overhanging dimension of the overhang portion from the side edge of the one rising portion is increased toward the central side from the rising proximal side and the rising distal side.

6. The lighting device according to claim 5, wherein at least the rising distal side portion of the overhang portion is bow-shaped.

7. The lighting device according to claim 6, wherein at least the rising distal side portion and the rising proximal side portion of the overhang portion are bow-shaped.

8. The lighting device according to claim 7, wherein the overhang portion is bow-shaped along the entire length thereof.

9. The lighting device according to claim 5, wherein the overhang portion has a symmetric shape such that the rising proximal side portion and the rising distal side portion have the same overhanging dimension from the side edge of the one rising portion.

10. The lighting device according to claim 6, wherein:
the rising distal side portion of the overhang portion is bow-shaped; and
the rising proximal side portion of the overhang portion is triangular.

11. The lighting device according to claim 1, wherein the overhang portion overhangs in a direction from the bottom portion to the other rising portion beyond a surface of the other rising portion on a side opposite to the light output side.

12. The lighting device according to claim 1, wherein the overhang portion is formed along the entire length of the side edge of the one rising portion.

13. The lighting device according to claim 1, wherein the rising portion is inclined with respect to the bottom portion.

14. The lighting device according to claim 1, wherein the chassis includes a side plate rising from the bottom plate and facing the rising portions with a space provided between the side plate and the rising portions.

15. The lighting device according to claim 1, wherein the light source is an LED.

16. The lighting device according to claim 15, wherein a plurality of LEDs are mounted on a LED board disposed parallel to the bottom plate and the bottom portion.

17. The lighting device according to claim 15, further comprising a diffuser lens disposed on the light output side with respect to the LED, wherein the diffuser lens is configured to output and diffuse light from the LED.

18. The lighting device according to claim 1, further comprising an optical member disposed on the light output side with respect to the light source, wherein:
the chassis includes, in a portion thereof facing the optical member, a light source disposed area in which the light source is disposed, and a light source non-disposed area in which the light source is not disposed;
the optical member includes a portion overlapping with the light source disposed area and a portion overlapping with the light source non-disposed area; and
light reflectance of at least a surface of the portion overlapping with the light source disposed area facing the light source is larger than light reflectance of at least a surface of the portion overlapping with the light source non-disposed area facing the light source.

19. The lighting device according to claim 18, wherein:
the portion of the chassis facing the optical member includes at least a first end portion, a second end portion positioned in an end portion opposite to the first end portion, and a central portion sandwiched between the first end portion and the second end portion;
the central portion corresponds to the light source disposed area; and
the first end portion and the second end portion correspond to the light source non-disposed area.

20. The lighting device according to claim 18, wherein the light source is a cold cathode tube.

21. The lighting device according to claim 18, wherein the light source is a hot cathode tube.

22. A display device comprising:
the lighting device according to claim 1; and
a display panel configured to provide a display by using light from the lighting device.

23. The display device according to claim 22, wherein the display panel includes a liquid crystal panel having a liquid crystal contained between a pair of substrates.

24. A television receiver comprising the display device according to claim 22.

* * * * *